United States Patent
Heinle et al.

(10) Patent No.: US 10,722,100 B2
(45) Date of Patent: Jul. 28, 2020

(54) HOUSEHOLD DISHWASHER FOR WASHING DISHES IN ONE OR MORE PARTIAL WASH CYCLES, AND ASSOCIATED METHOD

(71) Applicant: BSH Hausgeräte GmbH, Munich (DE)

(72) Inventors: Martin Heinle, Glött (DE); Hans-Peter Nannt, Gerstetten (DE); Kai Paintner, Welden (DE)

(73) Assignee: BSH Hausgeräte GmbH, Munich (DE)

( * ) Notice: Subject to any disclaimer, the term of this patent is extended or adjusted under 35 U.S.C. 154(b) by 318 days.

(21) Appl. No.: 15/550,380

(22) PCT Filed: Feb. 4, 2016

(86) PCT No.: PCT/EP2016/052335
§ 371 (c)(1),
(2) Date: Aug. 11, 2017

(87) PCT Pub. No.: WO2016/134938
PCT Pub. Date: Sep. 1, 2016

(65) Prior Publication Data
US 2018/0028042 A1    Feb. 1, 2018

(30) Foreign Application Priority Data

Feb. 27, 2015  (DE) .................... 10 2015 203 532
Dec. 22, 2015  (DE) .................... 10 2015 226 481

(51) Int. Cl.
*A47L 15/42*  (2006.01)
*A47L 15/46*  (2006.01)
*A47L 15/48*  (2006.01)

(52) U.S. Cl.
CPC ....... *A47L 15/4291* (2013.01); *A47L 15/4209* (2016.11); *A47L 15/46* (2013.01);
(Continued)

(58) Field of Classification Search
CPC .................... A47L 15/4291; A47L 15/4209
See application file for complete search history.

(56) References Cited

U.S. PATENT DOCUMENTS 2,422,492 A * 6/1947 Losee ............... F24H 1/185
                                                 392/442
3,580,014 A * 5/1971 Mazza ............... D06F 37/20
                                                 68/23.1
(Continued)

FOREIGN PATENT DOCUMENTS

DE    102013216741 B3 * 12/2014 .......... D06F 39/006
EP        2193741 A2      6/2010
(Continued)

OTHER PUBLICATIONS

Machine translation of DE-102013216741-B3, dated Dec. 2014 (Year: 2014).*
(Continued)

*Primary Examiner* — Joseph L. Perrin
*Assistant Examiner* — Kevin G Lee
(74) *Attorney, Agent, or Firm* — Michael E. Tschupp; Andrew Pallapies; Brandon G. Braun

(57) ABSTRACT

A household dishwasher includes a wash container for holding dishes to be washed and a fill reservoir attached to the wash container. The fill reservoir is filled with fresh water from a fresh water network, and a quantity of fresh water required for the wash sub-cycle is removed from the fill reservoir and feed into the wash container. A heat pump includes an evaporator which is thermally coupled to the fill reservoir to extract heat energy from stored fresh water, and a condenser via which heat energy is fed into an interior space of the wash container. Disposed between the interior space of the wash container and an interior space of the fill
(Continued)

reservoir is a single-layer or multilayer insulation material system to reduce a heat flow from the wash container.

30 Claims, 11 Drawing Sheets

(52) U.S. Cl.
CPC ....... *A47L 15/4217* (2013.01); *A47L 15/4246* (2013.01); *A47L 15/4285* (2013.01); *A47L 15/483* (2013.01); *Y02B 30/52* (2013.01); *Y02B 40/44* (2013.01); *Y02B 40/46* (2013.01)

(56) References Cited

U.S. PATENT DOCUMENTS

| | | | | |
|---|---|---|---|---|
| 5,535,774 | A | * 7/1996 | Davies | .................... A47L 15/42 |
| | | | | 134/105 |
| 2010/0229900 | A1 | 9/2010 | Rosenbauer | |
| 2012/0073608 | A1 | 3/2012 | Rieger et al. | |
| 2012/0312337 | A1 | * 12/2012 | Boyer | ................. A47L 15/0039 |
| | | | | 134/111 |
| 2013/0305747 | A1 | 11/2013 | Krische et al. | |
| 2014/0041695 | A1 | * 2/2014 | Ellingson | ............ A47L 15/0047 |
| | | | | 134/105 |
| 2015/0017360 | A1 | * 1/2015 | Krupicka | ............ A47L 15/4246 |
| | | | | 428/35.7 |

FOREIGN PATENT DOCUMENTS

| | | | | |
|---|---|---|---|---|
| EP | 2206824 | A2 | 7/2010 | |
| EP | 2465405 | A2 | 6/2012 | |
| EP | 2662013 | A1 | 11/2013 | |
| EP | 3036364 | B1 * | 5/2017 | .......... D06F 39/006 |
| JP | 2007125198 | A | 5/2007 | |
| KR | 20070046740 | A | 5/2007 | |

OTHER PUBLICATIONS

Machine translation of EP-2206824-A2, dated Jul. 2010. (Year: 2010).*

Machine translation of EP-3036364-B1, dated May 2017. (Year: 2017).*

International Search Report PCT/EP2016/052335 dated Apr. 29, 2016.

National Search report DE 10 2015 203 532.8 dated Oct. 9, 2015.

* cited by examiner

HOUSEHOLD DISHWASHER FOR WASHING DISHES IN ONE OR MORE PARTIAL WASH CYCLES, AND ASSOCIATED METHOD

CROSS-REFERENCES TO RELATED APPLICATIONS

This application is the U.S. National Stage of International Application No. PCT/EP2016/052335, filed Feb. 4, 2016, which designated the United States and has been published as International Publication No. WO 2016/134938 A1 and which claims the priorities of German Patent Applications, Serial No. 10 2015 203 532.8, filed Feb. 27, 2015, and Serial No. 10 2015 226 481.5, filed Dec. 22, 2015, pursuant to 35 U.S.C. 119(a)-(d).

BACKGROUND OF THE INVENTION

The invention relates to a household dishwasher for washing dishes in one or more water-conducting wash sub-cycles and for subsequently drying the dishes in at least one subsequent drying cycle of a wash cycle to be performed.

In conventional dishwashers an electric water heater is generally provided, in particular with at least one electric heating resistor, in order to be able to heat a quantity of water introduced in each instance into the wash container of the dishwasher for at least one water-conducting wash sub-cycle, for example for the cleaning cycle and/or final rinse cycle, of a wash cycle to be performed, to a required temperature. It can be configured for example in the form of a flow-through heater. It is preferably a component of the liquid circulation circuit of the dishwasher, which comprises in particular a circulating pump, in some instances a water switch for the selective coupling of feed tubes leading to a number of spray facilities to the outlet tube of the circulating pump, one or more spray facilities, a pump sump positioned on the bottom of the wash container, in which the wash liquid sprayed out by the one or more spray facilities collects in the wash container, and/or in some instances valves, liquid connecting lines, etc. The water heater can be housed in particular in the housing of the circulating pump, thereby forming what is referred to as a heat pump. The mode of operation of a water heater is based in particular on the principle of the electric resistance heater, in which electrical energy is converted to thermal energy, which is transferred to the water flowing past or in the water heater. In practice what is known as a tubular heating unit can be used, being located preferably in a water-conducting tube, in particular a tube through which water flows. Alternatively a tube segment can also be provided, for example, having at least one tubular heating unit or what is referred to as a thick-layered conductive heating track on the outside, with water flowing through its interior when the circulating pump of the dishwasher is activated. The heating of the quantity of water introduced into the wash container for the performance of the respective wash sub-cycle, for example the cleaning cycle and/or final rinse cycle, to a required minimum temperature requires the generation of a specified thermal energy or heat energy by the electric resistance heater, which involves a corresponding electrical energy requirement. It is desirable to keep this electrical energy consumption as low as possible.

BRIEF SUMMARY OF THE INVENTION

It is the object of the invention to provide a household dishwasher, in which, to perform a wash cycle of a dishwashing program, the electrical energy input to cover the thermal energy requirement of the one or more wash sub-cycles, in which a specific quantity of water is heated to a desired minimum temperature in the wash container, is reduced.

This object is achieved by an inventive dishwasher with the features described below:

Household dishwasher for washing dishes in one or more water-conducting wash sub-cycles and for subsequently drying the dishes in at least one subsequent drying cycle of a wash cycle to be performed
  with a wash container for holding the dishes to be washed,
  with at least one fill reservoir attached to the outside of the wash container, the inlet of which is connected to an inlet-side fresh water feed apparatus for filling with fresh water from a fresh water network and the outlet of which is connected to an outlet-side fresh water discharge apparatus for taking a quantity of fresh water required in each instance for the respective wash sub-cycle to be performed from the fill reservoir and feeding it into the wash container,
  with at least one heat pump, the circuit of which comprises a compressor, pressure reduction means, an evaporator and a condenser, the evaporator being thermally coupled to the fill reservoir to extract heat energy from fresh water stored there and the condenser being provided to feed heat energy into the interior space of the wash container, and
  with a single-layer or multilayer insulation material system between the interior space of the wash container and the interior space of the fill reservoir to reduce a heat flow from the wash container.

The fill reservoir therefore serves on the one hand as a filler tank, from the outlet of which a quantity of fresh water required for the respective wash sub-cycle flows into the wash container by way of a discharge apparatus. On the other hand the fill reservoir forms a heat source or heat reservoir for the heat pump circuit, the evaporator of the heat pump pumping heat energy therefrom. There is therefore no need for a heat store in the form of an additional, specifically provided closed tank.

The fill reservoir can also serve in particular to cool the wall it covers, in particular makes contact with, during the drying cycle of a wash cycle, so that condensation drying is favored on its internal wall surface in the interior space of the wash container. The fill reservoir therefore also functions as a heat exchanger with cooling function to assist drying.

The thermal insulation system or heat insulation system provided between the interior space of the wash container and the interior space of the fill reservoir on the one hand acts as a thermal barrier or boundary between the interior space of the wash container and the interior of the fill reservoir to ensure that during operation of the heat pump said heat pump can pump more heat energy overall into the wash container (in relation to a desired heating time period) than is lost externally overall due to heat transfer from the wash container. On the other hand the single-layer or multilayer insulation material system or heat insulation system still provides poor thermal coupling between the interior space of the wash container and the interior space of the fill reservoir so that lost heat due to the transfer of heat from the interior space of the wash container through the insulation material system can be absorbed by the fresh water in the fill reservoir and pumped back into the wash container by the heat pump when it is brought back into operation. It only permits a temporally delayed, in other words constricted or reduced passage of heat from the wash container back into the fill reservoir. The fill reservoir therefore also serves as a means of absorbing or collecting lost heat that escapes due to a transfer of heat by way of the respective wall of the wash container to the outside of which the fill reservoir is attached. This advantageously allows heat regeneration by a heat circulation circuit, which comprises the fill reservoir as heat source, the heat pump as transport means for the heat pumped out of the fill reservoir, the wash container as heat sink and the single-layer or multilayer insulation material system between the interior space of the wash container and the interior space of the fill reservoir as thermal coupling means with retarding, in other words slowing function, for the heat transfer from the interior space of the wash container into the interior space of the fill reservoir. The single-layer or multilayer insulation material system therefore reduces a heat flow from the wash container into the fill reservoir (compared with when a fill reservoir is attached to the outside of a wall of the wash container in direct thermal contact and without additional thermal insulation material).

This allows the inventive dishwasher to be operated particularly efficiently with electrical energy, in other words the electrical energy input per wash cycle can be significantly reduced compared with a conventional dishwasher (without heat pump and without inventively configured and arranged fill reservoir).

The multiple function of the fill reservoir as fresh water filling means for the wash container, heat reservoir for the heat pump, heat exchanger with cooling function for assisting drying and absorbing or collecting means for lost heat from the wash container means that the little space available in the housing of the dishwasher is sufficient to house all said functionalities and the structure of the household dishwasher can be kept simple despite the use of a heat pump. In particular it is possible to retain the previous basic structure of a dishwasher with a water container that can be filled with fresh water to assist drying attached to the outside of its wash container.

As the fill reservoir can be filled with fresh water from a fresh water network by way of the inlet-side fresh water feed apparatus and a quantity of fresh water required in each instance for the respective wash sub-cycle to be performed in the wash container can be taken partially or completely therefrom by way of the outlet-side fresh water discharge apparatus, it is possible to change the water in the fill reservoir partially or completely from one wash cycle to the next, subsequent wash cycle or even from one wash sub-cycle to the next wash sub-cycle within the duration of a wash cycle. This exchange of water largely prevents an impermissibly high incidence of micro-organisms or other impurities in the fill reservoir.

When in at least one wash sub-cycle, in particular in a number of wash sub-cycles of the wash cycle of an ongoing dishwashing program, a quantity of fresh water required for the respective wash sub-cycle is taken from the fill reservoir, and fresh water is then introduced into the fill reservoir by means of the fresh water feed apparatus for at least one wash sub-cycle, in particular the same wash sub-cycle, an at least partial or even complete change of water is performed in the fill reservoir per wash cycle, in particular even per wash sub-cycle. This greatly reduces the risk of impermissible contamination of the inventive fill reservoir with undesirable micro-organisms compared with a completely closed heat storage tank.

In particular the fresh water feed apparatus has a softening unit, preferably an ion exchanger. This advantageously allows the fill reservoir to be filled with softened fresh water, which is used as wash liquid in the wash container for the respective water-conducting wash sub-cycle of a wash cycle after being taken out in each instance.

According to one advantageous development of the invention after a phase, for example in a cleaning cycle, during which a heat pump operation has been first performed to heat a quantity of water to a desired temperature in the wash container, resulting in a reduction, in particular depletion of the quantity of heat energy in the fresh water of the fill reservoir, a regeneration phase expediently follows to replenish the heat energy in the fill reservoir. This sequence of the heat pump extracting heat from the fill reservoir and thermal regeneration of the fill reservoir can advantageously be set by means of a monitoring facility which controls and/or regulates the heat pump. During this regeneration phase the heat pump is in particular deactivated or its pump output is reduced. To this end its compressor preferably receives a corresponding influencing signal from the monitoring facility, in particular control and/or regulation facility. During the regeneration phase in particular icy water/solid ice that has formed in the fill reservoir during a preceding, first heat pump operation for a wash sub-cycle, for example the cleaning cycle, is thawed, in other words made liquid. Icy water here refers in particular to a mixture of pieces of ice and liquid water. The regeneration phase ensures that sufficient fresh water is present in liquid form in the fill reservoir to allow a desired quantity of fresh water to be taken out of the fill reservoir easily to fill the wash container for a subsequent wash sub-cycle (with or without heat pump operation), for example the intermediate wash cycle of a wash cycle. After its regeneration the fill reservoir is also replenished with sufficient thermal energy to allow a second phase with heat pump operation, as for example in the final rinse cycle, to follow. The thermal regeneration of the fill reservoir therefore takes place in particular at least in such a manner that after a first phase with heat pump operation, as for example in the cleaning cycle, to heat a first quantity of water in the wash container to a desired first temperature, it is possible to operate the heat pump again subsequently, as for example in the final rinse cycle, to heat a second quantity of water in the wash container to a desired second temperature.

During a time segment with the heat pump deactivated, for example the intermediate wash cycle, which takes place between two heating time segments at different times, each comprising heat pump operation, in particular of two wash sub-cycles, for example the cleaning cycle and final rinse cycle of a wash cycle, at separate times from one another, icy water and/or solid ice that has formed in the fill reservoir due to the extraction of heat by means of the evaporator during the first heating time period, or first phase with heat pump operation, in particular during the heating phase of the cleaning cycle is in particular expediently thawed and the now liquid fresh water in the fill reservoir is heated to such a temperature that the second heating of a specified quantity of water in the wash container, for example in the final rinse cycle, to a desired minimum temperature can then be performed by means of the heat pump. Thus during the regeneration time segment, which is between the two temporally offset phases with heat pump operation, the fresh water stored in the fill reservoir is preferably heated back to a temperature above the freezing point of water, in particular at least 4° C., preferably between 15° C. and 30° C.

The thermal regeneration of the fill reservoir can preferably take place as a result of the transfer of the heat energy introduced into the wash container back out of the interior space of the wash container through the thermal insulation system into the interior space of the fill reservoir, for example as a result of lost heat from the wash container.

To assist this the ambient heat at the site of the dishwasher can in some instances contribute to the thermal regeneration of the fill reservoir, as the fresh water content of the fill reservoir has a temperature lower than ambient temperature after a phase of heat pump operation, so that a transfer of ambient heat to the fill reservoir results from this temperature gradient.

In particular it can also be expedient in some instances if fresh water is then introduced into the fill reservoir from a fresh water network by means of the feed apparatus for the thermal regeneration of the fill reservoir. The fresh water thus added generally has an inflow temperature which is higher than the temperature of the cold water or icy water/solid ice in the fill reservoir that has formed there after a phase with heat pump operation, for example after the heating time period during the cleaning cycle. While the icy water/ice in the fill reservoir has a temperature of less than 4° C., in particular below 0° C., at the end of the phase with heat pump operation, the fresh water flowing into the fill reservoir from a household fresh water network is generally 15° C. or more and is therefore 10° C. to 15° C. warmer than the cold water or icy water/solid ice in the fill reservoir that has formed in the fill reservoir after a phase with heat pump operation. The large heat capacity of water compared with air means that the fill reservoir can be thermally regenerated particularly efficiently and quickly by such feeding of fresh water into it. In particular the contact of the fresh water flowing into the fill reservoir with the icy water/solid ice present there ensures a short thaw time which is shorter than if thermal regeneration were only to take place by way of loss heat and/or ambient heat. If the thermal regeneration of the fill reservoir is performed by feeding in fresh water, a heat insulation element with an in particular lower specific thermal insulation coefficient can be provided between the wash container and the fill reservoir, so that the heat energy introduced into the wash container by means of the heat pump can be retained even more efficiently therein, which can be advantageous for the overall energy footprint of the dishwasher per wash cycle. It is expedient for the regeneration of the fill reservoir by feeding in fresh water if the container of the fill reservoir has a sufficiently large top-up volume for fresh water in addition to its ice storage volume and there is an adequate contact zone between the ice and the fresh water subsequently introduced.

It can generally be expedient, if the inlet-side fresh water feed apparatus for feeding fresh water into the fill reservoir is configured and/or can be set in particular with the aid of a monitoring facility such that after the heating phase of a wash sub-cycle, in which the quantity of water present in the wash container has been heated with the aid of the condenser of the heat pump and in which the quantity of fresh water present in the fill reservoir has been cooled to a cold water temperature lower than the inflow temperature of the fresh water, in particular to less than 8° C., preferably being partially or completely frozen to form ice, with the aid of the evaporator of the heat pump, for fresh water with a higher inflow temperature than the cold water temperature to be introduced into the fill reservoir again to regenerate said cold water or ice. To this end the container of the fill reservoir expediently has a sufficiently large top-up volume for fresh water in addition to its ice storage volume. This prevents fresh water, which is introduced to thaw the ice in the fill reservoir, reaching the wash container at too low a temperature, in particular during the ongoing wash sub-cycle with heat pump operation or a subsequent water-conducting wash sub-cycle, but allows it to remain in the fill reservoir until it has been heated to a sufficiently high temperature by lost heat from the wash container.

In addition to its predetermined target fill volume for liquid fresh water the fill reservoir expediently has a free space or empty space, into which icy water/ice that can form from the fresh water stored in the fill reservoir by cooling by means of the evaporator during operation of the heat pump can expand as a result of its increase in volume (compared with the spatial volume taken up by liquid water). In some instances the additional free space can also be provided in that a material, in particular plastic, is selected for the fill reservoir, this yielding and thus allowing the volume enclosed by the container of the fill reservoir to expand or increase when ice forms. The container of the fill reservoir therefore always remains functional, in other words the fill reservoir is therefore not damaged.

It can be expedient in particular for the fill reservoir to have been filled with fresh water, in particular filled full of fresh water to its full target fill volume for liquid water, with an adequate waiting period before the start of the wash cycle of a dishwashing program to be performed, in particular during the preceding wash cycle, so that the transfer of heat from the environment causes the fresh water in the fill reservoir to be preheated approximately to room temperature at the site of the dishwasher. The fill reservoir then has a higher temperature level and therefore a higher thermal storage density (in the sensible heat range) from the start than a heat storage tank which is only filled with fresh water at the start of the first wash sub-cycle of the wash cycle of a dishwashing program to be performed. This saves electrical energy during the subsequent operation of the heat pump, as a higher coefficient of performance (COP) results for this.

The fill reservoir is expediently attached to the outside of a wall, in particular a side wall, of the wash container. In particular it is attached there permanently with significant surface contact. This ensures that heat losses from the wash container can be absorbed by the fresh water of the fill reservoir and can be stored therein and can be transferred back into the wash container by way of the condenser of the heat pump when this is next brought into operation.

The fill reservoir is favorably configured as a hollow unit, in particular with a flat box or cube shape. This means that it takes up little space on the wall of the wash container so that predetermined dimensions or measurements of the dishwasher can be maintained. It preferably has a fill volume between 2 and 10 l.

According to one advantageous development of the invention the thermal insulation material system comprises at least one, in particular flat, heat insulation element, which is configured as a solid unit, in particular as insulating fleece or a foam material layer. This ensures a permanent thermal barrier or thermal brake between the interior space of the wash container and the internal space of the fill reservoir. Only this allows heat energy to be pumped from the fresh water stored in the fill reservoir into the interior space of the wash container by means of the heat pump, thus allowing it to be heated without the heat energy pumped in escaping again immediately—even during operation of the heat pump—largely or predominantly from the wash container and being transferred back into the relatively colder fresh water of the fill reservoir by heat transfer. The thermal insulation material thus brings about a time delay or slowing for the heat transfer process or heat flow out of the interior space of the wash container; in other words it stops or holds back the heat energy pumped as a whole by the heat pump into the wash container and enclosed there for a predetermined time period. This can be determined based on the selection of material for the insulation material system. The heat flow from the wash container through the wall with the fill reservoir attached to the outside is reduced by the thermal insulation system provided between the two compared with a heat flow from the wash container that passes through a wall of the wash container without fill reservoir and without heat insulation system.

According to one advantageous development of the invention provision is made for the flat heat insulation element expediently to rest on the outside of the outer wall of the wash container or treatment container or on the outside of a coating layer, in particular a bitumen layer, applied to the wall and for the fill reservoir to be positioned above this with surface contact. With this multilayer construction the coating layer, in particular the bitumen layer, on the outside of the wall allows further requirements, for example relating to the shielding of noise from the wash container, to be met, while the heat insulation element ensures the required thermal barrier or brake between the interior space of the wash container and the interior space of the fill reservoir. No changes are required to the standard basic construction of a wash container, which is covered on the outside with bitumen matting to deaden sound.

It is particularly advantageous in respect of energy if the fill reservoir covers at least 50%, in particular between 70% and 100%, of the entire surface of the wall of the wash container assigned to it, preferably essentially the entire surface of the wall of the wash container assigned to it. The greater the surface portion of the respective wall of the wash container covered on the outside by the fill reservoir, the more heat energy escaping from the wash container—despite heat insulation element attached to the outside of the wall—can be collected by way of it by the fresh water stored in the fill reservoir.

It can be particularly expedient if a number of, in particular the two opposing, side walls, of the wash container are each covered on the outside by at least one fill reservoir. The more walls of the wash container are provided with a fill reservoir on the outside, the more efficiently it is possible to absorb heat losses from the wash container in the fresh water of the respective fill reservoir, causing it to be heated. This means that less heat energy from the wash container is lost to the environment at the site of the dishwasher, instead remaining in the heat circuit system of fill reservoir, heat pump and wash container. It is particularly favorable if a fill reservoir filled with fresh water is attached respectively to the outside of all the walls of the wash container in a corresponding manner. Then any heat energy escaping from the wash container can be collected by the fill reservoirs all round and used again for the next heat pump operation.

It can be expedient in particular if the evaporator of a specifically provided heat pump is thermally coupled to each fill reservoir. Alternatively a number of fill reservoirs can be thermally coupled to the evaporator segments of the evaporator of a shared heat pump. This is less complex. According to a further advantageous variant the evaporator of the heat pump can be thermally coupled to just one fill reservoir or a first group of fill reservoirs, while the other fill reservoirs or the second group of reservoirs is/are connected fluidically to said fill reservoir or said first group of fill reservoirs and do(es) not require evaporator coupling, in other words is/are evaporator-free. This keeps the structural outlay within limits.

According to a further expedient development of the invention the fill reservoir has more thermal insulation on its wall side facing the wash container than on its wall side facing away from the wash container, in particular facing the environment. This also allows heat energy from the environment at the site of the dishwasher to be collected by the fresh water in the fill reservoir. A thermal insulation layer on the wall of the fill reservoir facing away from the wash container here ensures that an undesirably high level of condensation of moisture from the ambient air is largely prevented there. This is advantageous as the dishwasher can be installed in kitchen spaces without condensate problems. In particular it is suitable for installation in a kitchen furniture recess without the risk of damaging adjacent kitchen furniture elements or a worktop above the dishwasher due to condensate.

In some instances however it may be sufficient for example for a corresponding condensate collection element to be provided, which is assigned to the respective outer wall of the fill reservoir facing away from the wash container. There is then no need for thermal insulation on the side of the fill reservoir facing away from the wash container.

According to one expedient development of the invention the thermal insulation material system as a whole has a thermal resistance $R_T$ of at least 0.02 $(K\,m^2)/W$, in particular between 0.1 $(K\,m^2)/W$ and 1 $(K\,m^2)/W$. This on the one hand provides an adequate thermal barrier or brake for the heat energy introduced into the interior space of the wash container during a wash sub-cycle with wash liquid to be heated, in other words said heat energy is retained in the interior space of the wash container for the duration of the wash sub-cycle such that a profile of the pattern of temperature over time as required for said wash sub-cycle can be maintained in the interior space of the wash container. This profile preferably corresponds approximately to the pattern of temperature over time of the same wash sub-cycle in a conventionally designed dishwasher (without heat pump). On the other hand the poor thermal coupling effect of the insulation material system is sufficient during the drying cycle that completes the wash cycle to cool the wall of the wash container, to the outside of which the fill reservoir is attached, sufficiently in relation to the air and/or the dishes in the wash container for desired condensation drying, if the fill reservoir is previously cooled by the heat pump operation during the wash sub-cycle immediately preceding the drying cycle, for example the final rinse cycle. This is only the case if the heat pump continues to be operated, in other words is activated, during the drying cycle according to an advantageous development of the invention.

According to one advantageous development of the invention it is favorable for the energy footprint of a wash cycle, if the fill reservoir is connected to the wash container in a thermally active manner, in particular they are thermally coupled to one another by an insulation material system separating the interior space of the wash container and the interior space of the fill reservoir from one another, and the overall liquid fill volume of the fill reservoir is selected such that a thermal time constant $\tau$ (unit: min (minutes)) of between 5 min (minutes) and 60 min, in particular between 10 min and 30 min, results for the transfer of heat from the wash container to the fill reservoir from the product of the thermal resistance Rth (unit: K/W) of the insulation material system between the interior space of the wash container and the interior space of the fill reservoir and the thermal capacity Cth (unit: (W sec)/K) of the quantity of water stored in the fill reservoir. The time constant $\tau$ provides a simple measure or benchmark for the time after which a quantity of heat introduced into the wash container discharges itself into the fill reservoir (by heat transfer) by way of the thermal insulation material system. According to a first estimate after time period $_T$ the difference between the temperature in the wash container and the temperature in the fill reservoir has dropped to around 37% of its initial value present at the end of a heating time segment for a water-conducting wash sub-cycle.

If the wall of the wash container, which is preferably made of metal, in particular stainless steel, to the outside of which the fill reservoir is attached, is covered with a bitumen layer to deaden or insulate against sound, in particular generally between 2 mm and 10 mm wall thickness, and at least one heat insulation element, for example a fleece or foam unit is also applied, tests have shown that it is advantageous for an adequate thermal blocking effect if a material with a specific heat conductivity of maximum 0.5 W/(m K), in particular between 0.1 and 0.005 W/(m K), is selected for the heat insulation element. This largely prevents the fill reservoir, the added fresh water of which is already cooled and/or made to form icy water/solid ice by the evaporator of the heat pump during its operation, cooling the wash container too significantly compared with a conventionally designed dishwasher (without heat pump), so that the required temperature profile to be followed over the duration of the wash cycle can be maintained in the wash container despite the cold water and/or ice in the fill reservoir.

It can be favorable in particular for the thermal insulation system to be configured so that it can be modified, preferably switched, in respect of its specific heat conductivity. It is advantageously configured to provide greater thermal insulation during the water-conducting wash sub-cycles, in particular those with wash liquid to be heated, than during the drying cycle. In other words its specific heat conductivity for the drying cycle is increased compared with the one or more preceding water-conducting wash sub-cycles. The thermal insulation between the fill reservoir and the wash container wall assigned thereto is thus expediently embodied as switchable heat insulation, such that in the drying phase it is able to conduct thermally more efficiently than before in the one or more water-conducting wash sub-cycles and thus the condensation heat from the wash container is dissipated more efficiently to the fill reservoir when the insulation is switched to conduct. This modification of the specific heat conductivity of the thermal insulation system can be brought about in particular by means of the monitoring facility.

To increase the cooling of the inside of the wall of the wash container, to the outside of which the fill reservoir is attached, during the drying cycle of a wash cycle, it can be expedient in particular for the heat pump to be activated, in other words operated in an operational manner, during the drying cycle that completes the wash cycle. This is particularly expedient if the preceding wash sub-cycle with heat pump operation, as for example during the final rinse cycle, does not cause the water in the fill reservoir to freeze, in other words the water in the fill reservoir remains liquid. The heat pump operation during the drying cycle ensures active, sustained cooling of the wall of the wash container, to which the fill reservoir is attached, in particular against which it rests, and more efficient condensation drying can take place thereon in the interior space of the wash container. It can be favorable here for the condenser of the heat pump to be in direct or indirect thermal contact with the air in the wash container, so that it is actively heated by the condenser during the drying cycle, making it able to absorb more moisture as a result.

In some instances the cooling of the quantity of fresh water in the fill reservoir brought about by the active operation of the heat pump can be so significant during the drying cycle that it is not necessary to provide a switchable heat insulation element but a stationary, non-switchable heat insulation element may suffice.

In some circumstances it may be favorable for the fill reservoir to be provided beforehand with a thermal insulation element or heat insulation element at least on the inside and/or outside of its wall facing the wash container. This can have advantages in respect of manufacture, as the fill reservoir is available as a prefabricated unit, can be stored as such and can be attached as a whole with heat insulation element already present to the respectively assigned wall of the wash container. There is then no need for an additional assembly step to attach a separate heat insulation element to the wall of the wash container facing the fill reservoir. This is favorable for the mass production of household dishwashers.

In some instances the fill reservoir can be provided with a thermal insulation sleeve all round. This can in particular reduce or prevent undesirable condensate forming on the wall of the wash container facing away from the wash container due to moisture from the ambient air at the site of the dishwasher, when the fill reservoir is cooled significantly by the operation of the heat pump.

It can be particularly expedient for the fill reservoir to be provided with a complete sleeve made of PCM, in other words to be provided with PCM (phase change material) as the insulation material all the way round on the inside wall and/or outside wall, the phase change temperature thereof being higher than that of the fresh water stored in an intermediate manner in the fill reservoir, in particular being between 3° C. and 10° C. Its phase change temperature is preferably selected so that it is lower than the temperature in the wash container at the end of the respective heating time segment of the respective wash sub-cycle with wash liquid to be heated, for example the cleaning cycle or final rinse cycle, so that lost heat from the wash container can be stored as latent heat therein. Standard PCM materials such as paraffins have relatively poor heat conducting properties, in other words they act as thermal insulation. This allows the fill reservoir to be thermally insulated inside and/or outside by PCM material attached to the inside wall and/or outside wall. Because the phase change of the PCM material takes place at a higher temperature level than the phase change of the water, the temperature of the wall of the fill reservoir on the outside of the fill reservoir facing away from the wash container remains approximately constant at melting temperature due to the emission of latent heat during the time period in which the heat pump operates and causes the fresh water in the fill reservoir to form icy water and/or solid ice. When the heat pump is deactivated, the PCM material absorbs heat from the environment and/or lost heat from the wash container and melts, as a result of which it is at least at melting temperature, which is higher than that of water in the fill reservoir. There is generally a temperature of around 15° C. to 24° C. in a kitchen, so the PCM is at its melting temperature that is higher than that of icy water/solid ice and lower than ambient temperature. This reduction in the temperature gradient between the temperature of the ambient air and the temperature of the outer wall of the fill reservoir facing away from the wash container, compared with when the outer wall of the fill reservoir facing away from the wash container has no PCM material, means that less water from the ambient air can condensate on the outside of the fill reservoir facing away from the wash container. This largely prevents contamination of or damage to the floor and/or adjoining kitchen furniture elements at the site of the dishwasher. When the fresh water in the fill reservoir has been cooled significantly, in particular to less than 4° C., preferably below 0° C., after the end of the last heat pump operation, as for example during the final rinse cycle, and become icy water/solid ice, the PCM which has also cooled to below its phase change temperature and hardened then delays the heating of the cold water or icy water/solid ice in the fill reservoir due to the lost heat escaping from the wash container compared with a fill reservoir without PCM. This is favorable for the drying cycle that completes the wash cycle.

It may be adequate in particular for the fill reservoir only to have at least one thermal insulation coating or layer, in particular made of PCM, on the outside and/or inside of its wall facing the wash container. A thermal insulation, in particular PCM material, can in some instances be omitted on its other walls. This saves insulation material and can be favorable in respect of design and assembly. An inventive insulation system with poor thermal coupling can thus be provided easily between the interior space of the wash container and the interior space of the fill reservoir.

Finally it can also be expedient additionally or independently for at least one PCM element or part to be housed in the interior of the fill volume of the fill reservoir, its phase change temperature expediently being selected to be higher than that of water, in particular between 3° C. and 20° C. When the fill reservoir is filled full of water, the PCM element is preferably surrounded by it all round. This allows the fill reservoir to be raised particularly favorably to a higher temperature level than without PCM, so the COP of the heat pump is improved.

Paraffins in particular can be selected as the PCM material. It is preferably enclosed in a leakproof sleeve all round so that it cannot flow out when it exceeds its phase change temperature, i.e. in the liquid state.

In addition to or independently of the above advantageous exemplary embodiment it can be expedient if a PCM material is used for the heat insulation element provided between the wash container and the fill reservoir attached to the outside, in other words generally in this advantageous variant at least one layer or coating made of PCM is inserted between the wall of the fill reservoir facing the wash container and the wall of the wash container facing the fill reservoir. The melting temperature of the PCM is advantageously selected to be higher than that of water and lower than the temperature in the wash container at the end of the heating time period of the respective wash sub-cycle with wash liquid to be heated. This helps the fill reservoir to reach a higher temperature, which advantageously results in a higher COP of the heat pump. As set out above, this is also favorable for the drying cycle, as the wall of the wash container, to which the fill reservoir is attached, can be kept sufficiently cool for the desired condensation of moisture from the moist warm air in the wash container thereon during the drying cycle for longer. There is then no need for thermal insulation, in particular a PCM sheath for the fill reservoir.

According to one advantageous development of the invention the heat pump can be configured and/or operated by means of a monitoring facility such that at the end of the heating time segment of a wash sub-cycle performed by means of the heat pump a wash bath quantity of water present in the wash container is heated to a required minimum temperature with the aid of the condenser of the heat pump and the fresh water in the fill reservoir is cooled by means of the evaporator of the heat pump to a temperature in a range between −4° C. and +10° C., in particular between 10% and 90% of the maximum fill volume of water, in particular fresh water, in the fill reservoir is made to freeze. The heat pump can then pump away both the sensible heat and also largely the latent heat from the quantity of water present in the fill reservoir, allowing it to be pumped into the wash container. In this way a relatively small volume of the fill reservoir, preferably 2 l to 10 l capacity, can suffice to heat the quantity of water present in the wash container for the respective wash sub-cycle to a desired predetermined temperature with the heat pump.

In can also be expedient in some instances if the fill reservoir is connected to the wash container in a thermally active manner and/or the heat pump is configured and/or operated in particular with the aid of a monitoring facility such that the temperature of the fresh water in the fill reservoir during the time period after the end of the heating time segment of a preceding wash sub-cycle, in which the quantity of water present in the wash container has been heated with the aid of the condenser of the heat pump, until the start of a subsequent wash sub-cycle, in particular until the start of a subsequent wash sub-cycle, in which the heat pump is brought into operation again, is lower than the temperature in the wash container, and in particular is predominantly lower than the ambient temperature at the site of the household dishwasher during this time period. The fill reservoir then collects lost heat from the wash container and also ambient heat particularly favorably and can regenerate itself with this. Its thermal regeneration by the feeding in of fresh water can then be required less frequently or can even be dispensed with completely so that fresh water can be saved. A relatively small fill volume of the fill reservoir is then also sufficient, for example between 2 l and 10 l.

It can be particularly advantageous in particular if the fill reservoir is connected to the wash container in a thermally active manner and/or the heat pump is configured and/or operated in particular with the aid of a monitoring facility such that ice/icy water that has formed in the fill reservoir due to the extraction of heat by the evaporator during the heating time segment of a preceding wash sub-cycle, in which the quantity of water present in the wash container has been heated with the aid of the condenser of the heat pump, has thawed by at least 25%, in particular between 40% and 100%, preferably 100%, of its ice volume present at the end of the heating time segment of the preceding wash sub-cycle by the start of a subsequent wash sub-cycle, in particular by the start of a subsequent wash sub-cycle, in which the heat pump has been brought into operation again, essentially by the transfer of heat from the wash container into the fill reservoir and/or in some instances by the transfer of heat from the environment of the household dishwasher to the fill reservoir and the thawed water in the fill reservoir at the start of the subsequent wash sub-cycle in particular has a temperature of at least 0° C., preferably between 15° C. and 30° C. A sufficient quantity of liquid water can then be taken from the fill reservoir and fed to the wash container for the subsequent wash sub-cycle. In particular the fill reservoir can be used again as a heat source for the renewed operation of the heat pump.

The fill reservoir is advantageously configured as an open storage unit, in other words during the respective wash cycle, in particular even for each water-conducting wash sub-cycle, stored fresh water is taken from it at least once by way of the discharge apparatus and during said wash cycle, in particular wash sub-cycle, new fresh water is fed to it at least once by way of the feed apparatus. This partial or complete exchange or change of water largely prevents contamination of the fill reservoir with micro-organisms, which is otherwise possible with a closed heat storage tank filled full of water once. Also the risk of unpleasant odors is not critical with an open storage unit. Also the partial or complete exchange or change of water in some instance advantageously allows efficient thermal regeneration of the fill reservoir. The single or multiple taking and feeding in of fresh water per wash cycle, preferably at least one taking and at least one feeding in operation per water-conducting wash sub-cycle, in particular at the end of the respective water-conducting wash sub-cycle or in the transition phase from one water-conducting wash sub-cycle to the next wash sub-cycle of a wash cycle, can also in some instances generate water movement, in particular a flow dynamic or water flow in the fill reservoir, in other words forces convection, resulting in a mixing of the quantity of new fresh water flowing in out of the feed apparatus and the quantity of water already present in the fill reservoir. A mixed temperature is therefore established for this water mix in the fill reservoir, this being between the inflow temperature of the new fresh water flowing in and the current temperature of the water present in the fill reservoir. If the heat pump is operated for a desired heating time period of a wash sub-cycle and as a result heat energy is extracted from the quantity of water contained in the fill reservoir by means of the evaporator, the quantity of water in the fill reservoir is cooled and ice is generated in particular to utilize the latent heat energy stored in the water. If fresh water is now introduced into the fill reservoir by means of the feed apparatus at least once during the period of heat extraction by means of the evaporator, the freezing of the quantity of water present in the fill reservoir can be delayed or, if icy water/ice has already formed, it can be thawed, in other words regenerated. The feeding in of fresh water therefore allows the fill reservoir to be topped up or replenished with thermal energy. For the extraction of a specified desired quantity of thermal heat energy by the heat pump the storage volume of the open fill reservoir for water can be smaller due to the feeding in of fresh water than would be the case with a closed water tank.

It can be particularly advantageous if the fill reservoir is configured as an overflow storage unit. Therefore if new fresh water is fed to the fill reservoir by way of the fresh water feed apparatus, the fill reservoir overflows and water flows from it automatically into the wash container by way of the discharge apparatus. A change or exchange of water thus takes place in the fill reservoir. Such an overflow storage unit design means that there is no need for a pump or valve in the discharge apparatus to take water from the fill reservoir. The fill volume of the fill reservoir provided also remains completely filled with water during the entire wash cycle. The fill reservoir is therefore available with its full storage volume either as a fresh water filling means for the wash container, a heat reservoir for the heat pump, an absorbing or collecting means for lost heat from the wash container in every water-conducting wash sub-cycle over the entire duration of the full wash cycle or optionally as a heat exchanger with cooling function for assisting drying for the drying cycle completing the wash cycle, in other words it is always fully functional.

Apart from the advantageous embodiment of an overflow storage unit it can be expedient generally speaking in this context for the fill reservoir, its inlet-side fresh water feed apparatus for feeding fresh water into the fill reservoir and/or its outlet-side fresh water discharge apparatus for taking fresh water from the fill reservoir to be configured and/or to be able to be set in particular with the aid of a monitoring facility such that essentially the same quantity of fresh water that is taken from the fill reservoir for the respective water-conducting wash sub-cycle and discharged into the wash container by way of the fresh water discharge apparatus is fed again to the fill reservoir by the fresh water feed apparatus largely with a complete time overlap with it being taken. The fill volume in the fill reservoir for the liquid water then always remains largely constantly full of water over the entire duration of the respective wash cycle (subject to the fill volume in the fill reservoir being completely filled with water at the start of the respective wash cycle). The fill reservoir, its inlet-side fresh water feed apparatus for feeding fresh water into the fill reservoir and/or its outlet-side fresh water discharge apparatus for taking fresh water from the fill reservoir is/are expediently configured and/or is/are able to be set in particular with the aid of a monitoring facility such that during the one or more wash sub-cycles and in some instances also during the drying cycle of the respective wash cycle that completes the wash cycle, in particular over the one or more filling and/or discharge sequences of the overall wash cycle the fill reservoir is always filled with fresh water approximately to the same target level, in particular the maximum target level, which is assigned to the maximum liquid fill volume of the fill reservoir.

According to a further embodiment it can be expedient for the fill reservoir, its inlet-side fresh water feed apparatus for feeding fresh water into the fill reservoir and/or its outlet-side fresh water discharge apparatus for taking fresh water from the fill reservoir to be configured and/or to be able to be set in particular with the aid of a monitoring facility such that the feeding of fresh water into the fill reservoir is coupled to, in particular correlated with, in particular in respect of time and/or quantity, the taking of fresh water from the fill reservoir for the respective water-conducting wash sub-cycle. This allows the thermal storage capacity of the fill reservoir and its absorption behavior in respect of the lost heat from the wash container, the thermal regeneration capacity, in particular thawing behavior of the fill reservoir, the taking behavior of the fill reservoir to fill the wash container with fresh water and/or its function as cooling means for assisting condensation drying during the respective drying cycle to be influenced in a variable and dynamic manner. In general terms thermodynamic processes in the fill reservoir and/or wash container can be influenced in a specific manner, in particular performed subject to monitoring, such that a required temperature profile in the wash container and/or in the fill reservoir can be maintained over the duration of the respective wash cycle.

It can preferably be favorable for at least one water movement means, in particular flow generation means, additionally to be provided, forcing water movement, in particular water flow, preferably circulating flow, in the fill reservoir, in particular when the heat pump is operating. This allows more regular cooling of all the water in the fill reservoir by the evaporator. It allows premature freezing of water at individual local points in the fill reservoir, for example on the evaporator tubes, to be avoided. As a result the entire content of sensible and latent heat in the respective overall quantity of water in the fill reservoir can be pumped away by the evaporator and can be pumped into the wash container to heat a quantity of liquid present there by means of the condenser of the heat pump. This allows the fill reservoir to have a smaller water storage volume compared with a closed heat storage tank with stationary water, so said fill reservoir can be attached to the outside of the wash container of the dishwasher while still allowing compliance with its predetermined appliance dimensions.

According to one advantageous development of the invention at least one detection means is provided to detect at least one parameter characterizing the respective heat energy content of the fill reservoir. The parameter used can be in particular the temperature in the interior space of the fill reservoir. In addition to or independently thereof the temperature in the wash container can also serve as the parameter. With the aid of this parameter characterizing the heat energy content of the fill reservoir a monitoring facility can preferably monitor, in particular control and/or regulate, the work sequence, in particular the activation and/or deactivation states, of the heat pump. In addition to or independently thereof the monitoring facility can influence the thermodynamic processes in the fill reservoir and/or in the wash container in a specific manner. It can thus predetermine for example the times when certain quantities of fresh water can be introduced into the fill reservoir and/or which quantity of water is taken from the fill reservoir.

It can be particularly advantageous in respect of energy if only the heat pump is provided to heat wash liquid in the wash container during the predetermined heating time segment of the cleaning cycle and during the predetermined heating time segment of the final rinse cycle of the respective wash cycle to be performed.

To shorten the respective heating time or to achieve a respectively required active temperature during the respective water-conducting wash sub-cycle with wash liquid to be heated, for example the cleaning or final rinse cycle, it can in some instances be expedient for an electric heater, in particular a water heater, to be provided in addition, in other words parallel, to the heat pump, it being possible for said heater to be brought into operation by a monitoring facility in addition to the heat pump to heat wash liquid in the wash container to a required minimum temperature, or to be brought into operation by a monitoring facility only after the heating time period of the heat pump after it has been deactivated to reheat wash liquid in the wash container to a required minimum temperature. The additional heater can be smaller in respect of electric power consumption and heat output than in a conventional dishwasher which has no heat pump, just a conventional water heater.

The invention also relates to an inventive method:

Method for washing dishes in the wash container of a household dishwasher, which is configured in particular according to at least one of the preceding claims, in one or more water-conducting wash sub-cycles and for then drying the dishes in at least one subsequent drying cycle of a wash cycle to be performed, wherein a quantity of water required for the respective wash sub-cycle to be performed in the wash container is taken partially or completely from at least one fill reservoir attached to the outside of the wash container, the inlet of which is connected to an inlet-side fresh water feed apparatus for filling with fresh water from a fresh water network and the outlet of which is connected to an outlet-side fresh water discharge apparatus for taking a quantity of fresh water required in each instance for the respective wash sub-cycle to be performed from the fill reservoir and feeding it into the wash container, wherein for at least one of the wash sub-cycles, for the quantity of water for which heating to a minimum temperature is required in the interior space of the wash container, heat energy is extracted by means of the evaporator of a heat pump from the fresh water stored in the fill reservoir and heat energy is fed into the interior space of the wash container by means of the condenser of the heat pump, and wherein a single-layer or multilayer insulation material system between the interior space of the wash container and the interior space of the fill reservoir reduces a heat flow from the wash container.

Other developments of the invention are set out in the subclaims.

The advantageous configurations and developments of the invention described above and/or set out in the subclaims can be applied individually or in any combination here, except for example in instances of clear dependencies or irreconcilable alternatives.

BRIEF DESCRIPTION OF THE DRAWINGS

The invention and its advantageous configurations and developments as well as their advantages are described in more detail below with reference to drawings illustrating exemplary embodiments in schematic outlines, in which.

DETAILED DESCRIPTION OF EXEMPLARY EMBODIMENTS OF THE PRESENT INVENTION

Figure 1:
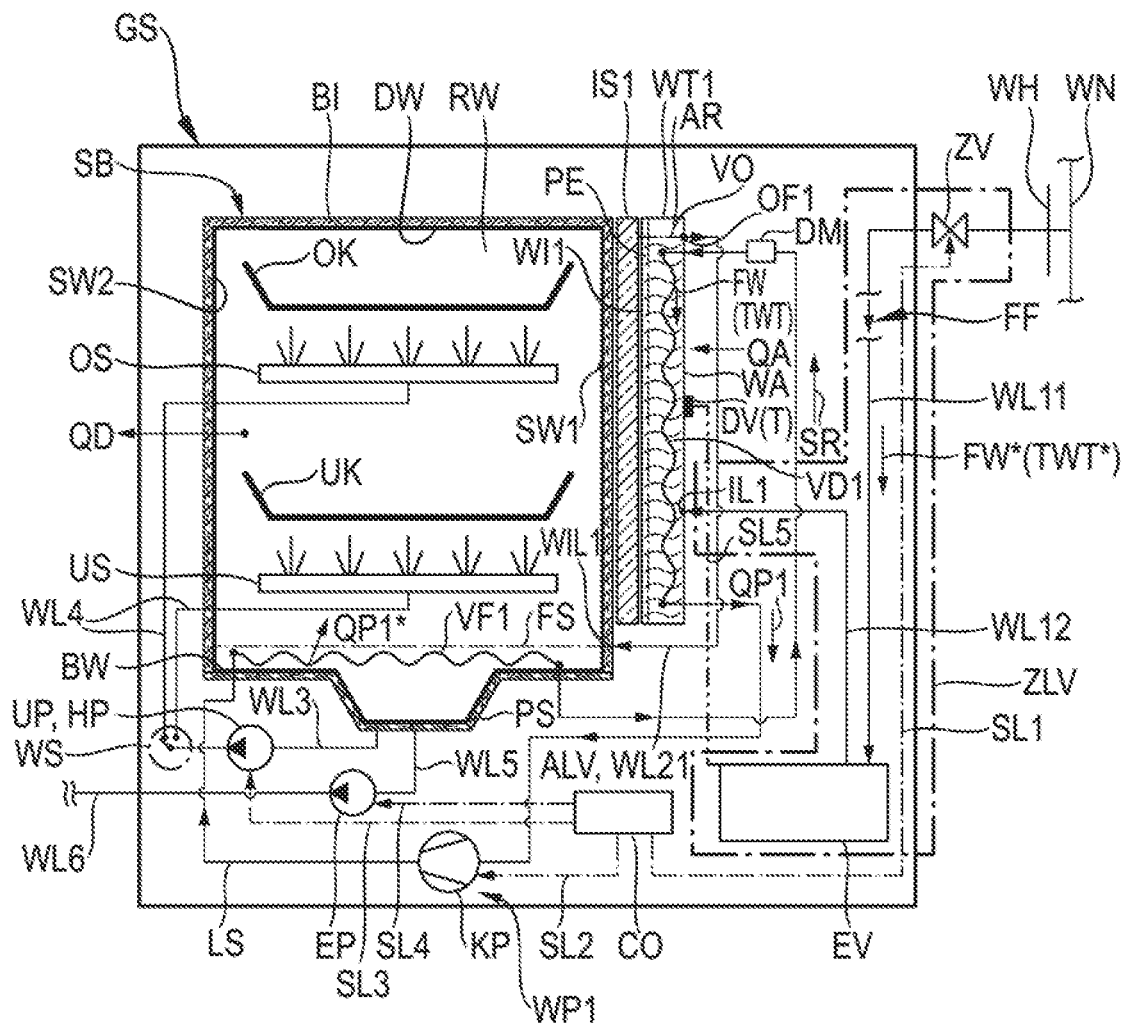
FIG. 1 shows a schematic front view of a first advantageous exemplary embodiment of an inventively configured dishwasher with a heat storage unit in the form of a fresh water fill reservoir, to which a heat pump is coupled.

Elements with the same function and mode of operation are shown respectively with the same reference characters in FIGS. 1-11. Only the parts of a household dishwasher that are necessary for an understanding of the invention are provided with reference characters and described.

FIG. 1 shows a schematic front view with the front door open of a first exemplary embodiment of a household dishwasher GS, which is configured according to the inventive principle. Its front door is omitted here for the sake of simplicity. The dishwasher GS has a wash container SB. This is preferably made of metal, in particular stainless steel. Here it is box-shaped and comprises a first side wall SW1 and a second side wall SW2 opposite it in the widthwise direction, a top wall DW and a bottom wall BW opposite this in the heightwise direction, as well as a rear wall RW when viewed in the depthwise direction. The bottom wall BW has a pump sump or collection region PS, in which wash liquid sprayed by one or more spray facilities OS, US in the interior space of the wash container SB can flow together or collect. The pump sump or pump well PS is preferably configured as a duct-type trough, which is lower than the remainder of the roughly horizontal region of the bottom wall BW. From the pump sump PS a first connecting line WL5 leads to a drain or waste water pump EP, by means of which wash liquid can be pumped out of the wash container SB by way of a waste water line WL6 as required. From the pump sump PS a second connecting line WL3 leads to a circulating or circulation pump UP. This can be used to take in wash liquid from the wash container SB and distribute it by way of one or more tubes WL4 to one or more spray facilities OS, US. In some instances a water switch WS is provided for this after the circulating pump UP when viewed in the flow direction. This is shown with a dot/dash line with a switch symbol in FIG. 1. It allows the outlet of the circulating pump UP to be connected fluidically to the inlet of the tube WL4 to a lower spray facility US and the inlet of the tube WL4 to an upper spray facility OS selectively or together depending on the wash cycle sequence. The lower spray facility US and the upper spray facility OS are preferably formed by rotatingly mounted spray arms. During operation of the circulating pump they spray wash liquid in the interior space of the wash container SB. In some instances at least one further tube to a further spray facility, for example a top sprinkler or another liquid dispensing facility, for example to a nozzle or the like, can be provided from the water switch WS.

At least one rack for items to be cleaned, e.g. dishes, glasses and/or flatware, is housed in the interior space of the wash container SB. It is configured so that it can be pulled out of the wash container in the depthwise direction (perpendicular to the plane of the drawing in FIG. 1 here) for unloading or loading and can be moved into the wash container for washing. In the exemplary embodiment in FIG. 1 here a lower rack UK is assigned to the lower spray facility US and an upper rack OK is assigned to the upper spray facility OS. In some instances a retractable flatware tray can be provided above the upper rack OK, being assigned to a top sprinkler on the top wall DW for spraying with wash liquid for example. Such a flatware tray and top sprinkler are omitted here for the sake of clarity.

One or more walls of the wash container SB, in particular the side walls SW1, SW2 and the bottom wall BW, are provided respectively with a coating layer BI, in particular bitumen matting on the outside, to deaden the sound of the dishwasher.

A thermal heat insulation element IS1 is attached in such a manner as to make contact with the outside of the coating layer BI of the first side wall SW1. A fill reservoir or fill container WT1 is provided in such a manner as to make surface contact on the outside of this. The heat insulation element IS1 is also inserted between the inner wall WI1 of the fill reservoir WT1 facing the wash container SB and the side wall SW1 with the coating layer BI. A multilayer thermal insulation material system is therefore present between the interior space of the wash container SB and the interior space of the fill reservoir WT1.

Viewed as a whole the thermal insulation material system preferably has a thermal resistance $R_T$ of at least 0.02 (K m$^2$)/W, in particular between 0.1 (K m$^2$)/W and 1 (K m$^2$)/W. This on the one hand provides an adequate thermal barrier or brake for the heat energy introduced into the interior space of the wash container during a wash sub-cycle with wash liquid to be heated, in other words said heat energy is retained in the interior space of the wash container for the duration of the wash sub-cycle such that a profile of the pattern of temperature over time as required for said wash sub-cycle can be maintained in the interior space of the wash container. This profile preferably corresponds approximately to the pattern of temperature over time of the same wash sub-cycle in a conventionally designed dishwasher (without heat pump). On the other hand the poor thermal coupling effect of the insulation material system is sufficient during the drying cycle that completes the wash cycle to cool the wall of the wash container, to the outside of which the fill reservoir is attached, sufficiently in relation to the air and/or the dishes in the wash container for desired condensation drying, if the fill reservoir is previously cooled by the heat pump operation during the wash sub-cycle immediately preceding the drying cycle, for example the final rinse cycle. This is only the case if the heat pump continues to be operated, in other words is activated, during the drying cycle.

Figure 10:
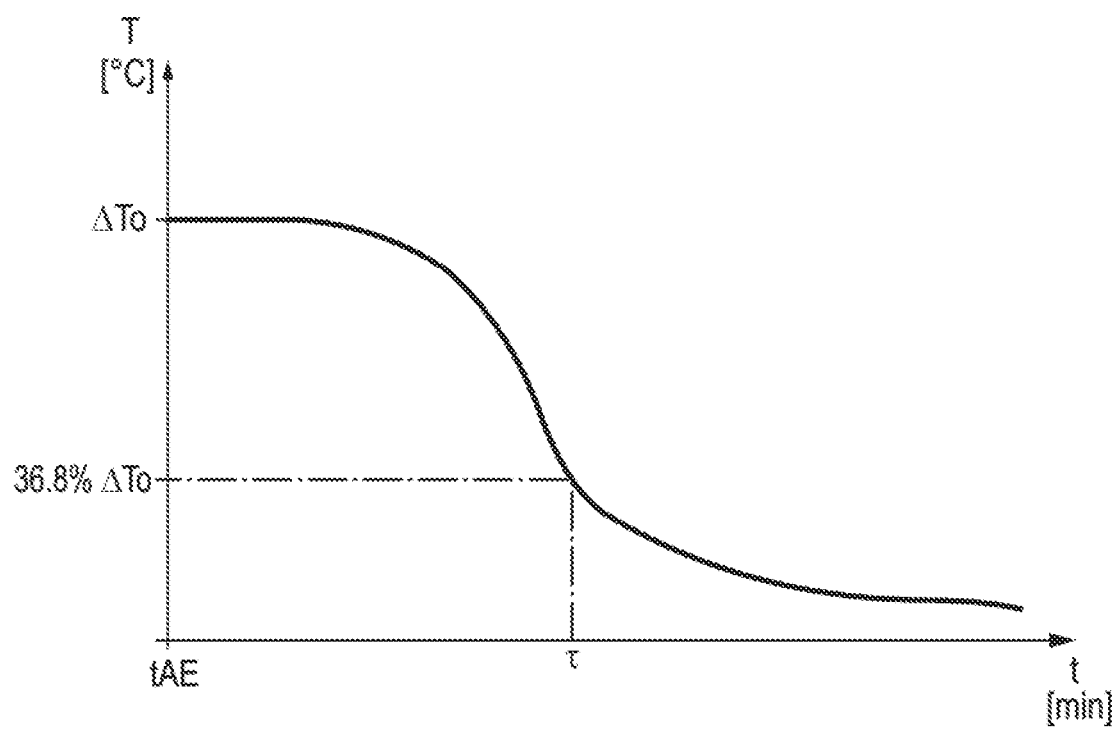
FIG. 10 shows a diagram characterizing the heat transfer behavior of the thermal insulation material system between the wash container and a fill reservoir attached to the outside thereof.

It is preferably favorable for the energy footprint of a wash cycle, if the fill reservoir is connected to the wash container in a thermally active manner, in particular if the interior space of the wash container and the interior space of the fill reservoir are poorly thermally coupled to one another by an insulation material system separating them from one another, and the overall liquid fill volume of the fill reservoir is selected such that a thermal time constant $\tau$ (unit: min (minutes)) of between 5 min (minutes) and 60 min, in particular between 10 min and 30 min, results for the transfer of heat from the wash container to the fill reservoir from the product of the thermal resistance Rth (unit: K/W) of the insulation material system between the interior space of the wash container and the interior space of the fill reservoir and the thermal capacity Cth (unit: (W sec)/K) of the quantity of water stored in the fill reservoir. The time constant $\tau$ provides a simple measure or benchmark for the time after which a quantity of heat introduced into the wash container discharges itself into the fill reservoir (by heat transfer) by way of the thermal insulation material system. According to a first estimate after time period $\tau$ the difference between the temperature in the wash container and the temperature in the fill reservoir has dropped to around 37% of its initial value present at the end of a heating time segment for a water-conducting wash sub-cycle. This heat transfer behavior of the thermal insulation material system between the wash container and a fill reservoir attached to the outside thereof is shown in FIG. 10. The initial temperature difference $\Delta T_0$ between the temperature in the wash container and the temperature in the fill reservoir drops approximately according to the exponential function $\Delta T = \Delta T_0 \, e^{(-t/T)}$. At time T only a 36.8% portion of the original temperature difference $\Delta T_0$ is present.

The container of the fill reservoir WT1 is configured as a hollow unit, in particular with a flat box or cube shape. It can in particular be made of plastic. It preferably has a capacity or maximum fill volume between 2 l and 10 l. The level assigned to its maximum fill volume is shown with a dot/dash line in FIG. 1 and marked VO. The fill reservoir covers at least 50%, in particular between 70% and 100% of the overall surface of the wall SW1 assigned to it, in the exemplary embodiment in FIG. 1 here preferably essentially the entire surface of the outside of the wall SW1 assigned to it. The heat insulation element IS1 expediently covers at least roughly the same outer surface of the side wall SW1 of the wash container provided with the coating layer BI. In the front view in FIG. 1 a water inlet, in other words an inlet opening WIL1 for fresh water from the fill reservoir WT1, is provided in the lower region of the side wall SW1 of the wash container. A cutout is expediently provided in the fill reservoir WT1 there. In the exemplary embodiment in FIG. 1 the fill reservoir WT1 is suspended above this water inlet WIL1 and extends approximately to the top wall DW of the wash container.

Connected to the inlet IL1 of the fill reservoir WT1 is a fresh water feed facility ZLV. The water inlet IL1 here is preferably provided in the lower region, in particular in the region of the bottom of the fill reservoir. The feed facility ZLV comprises a, preferably appliance-side, feed line WL11, which can be connected in particular to a water faucet WH of a household fresh water network WH. Provided in the feed line WL11 is an inlet valve ZV or some other throughflow control means, used to regulate the inflow or supply of fresh water FW* from the fresh water network WH into the dishwasher GS. A free flow distance FF can be provided in particular in the feed line WL11 to reliably prevent wash liquid being sucked back from the wash container into the fresh water network. Alternatively the inlet valve ZV can be provided in or in the region of the inlet opening IL1 of the fill reservoir. When the inlet valve ZV is open, fresh water FW* passes by way of the feed line WL11 into a softening unit EV to be decalcified or softened. From there it flows by way of a feed line WL12 to the inlet IL1 of the fill reservoir or fill container and into this latter.

The fill reservoir WT1 has an outlet OF1, to which a discharge apparatus ALV is connected. The water outlet OF1 here is preferably provided in the upper region of the fill reservoir WT1. Its lower edge is at roughly the same level or at the same height as the target fill level or a little above the target fill level VO reached by the fresh water when the target fill volume in the fill reservoir is filled full. In the exemplary embodiment here the discharge apparatus ALV has a discharge line WL21, which connects the outlet OF1 of the fill reservoir WT1 to the water inlet WIL1 of the wash container SBI.

A heat pump WP1 is provided, the evaporator VD1 of which is thermally coupled to the fill reservoir WT1 to extract heat from the fresh water FW stored in an intermediate manner there and the condenser VF1 of which serves to feed heat into the interior space of the wash container SB. The heat pump WP1 here comprises a circulation line system LS for a fluidic coolant. A compressor or some other pressure generation means KP is provided in the circulation line LS after the evaporator VD1 and before the condenser VF1 when viewed in the flow direction SR of the coolant. A pressure reduction means DM, for example an expansion valve and/or a small capillary tube is/are provided before the evaporator VD1 when viewed in the flow direction SR of the coolant, to depressurize the coolant in the circulation line LS.

The condenser VF1 is preferably positioned in the region of the bottom BW in the interior space of the wash container, in particular in the pump sump PS. When the wash container has been filled with the wash bath quantity WMi where i=VG, RG, ZG, KG required for the respective wash sub-cycle to be performed, the condenser is preferably in the water or respective wash bath quantity so a favorable transfer of heat is ensured from the condenser to the wash bath quantity.

Figure 11:
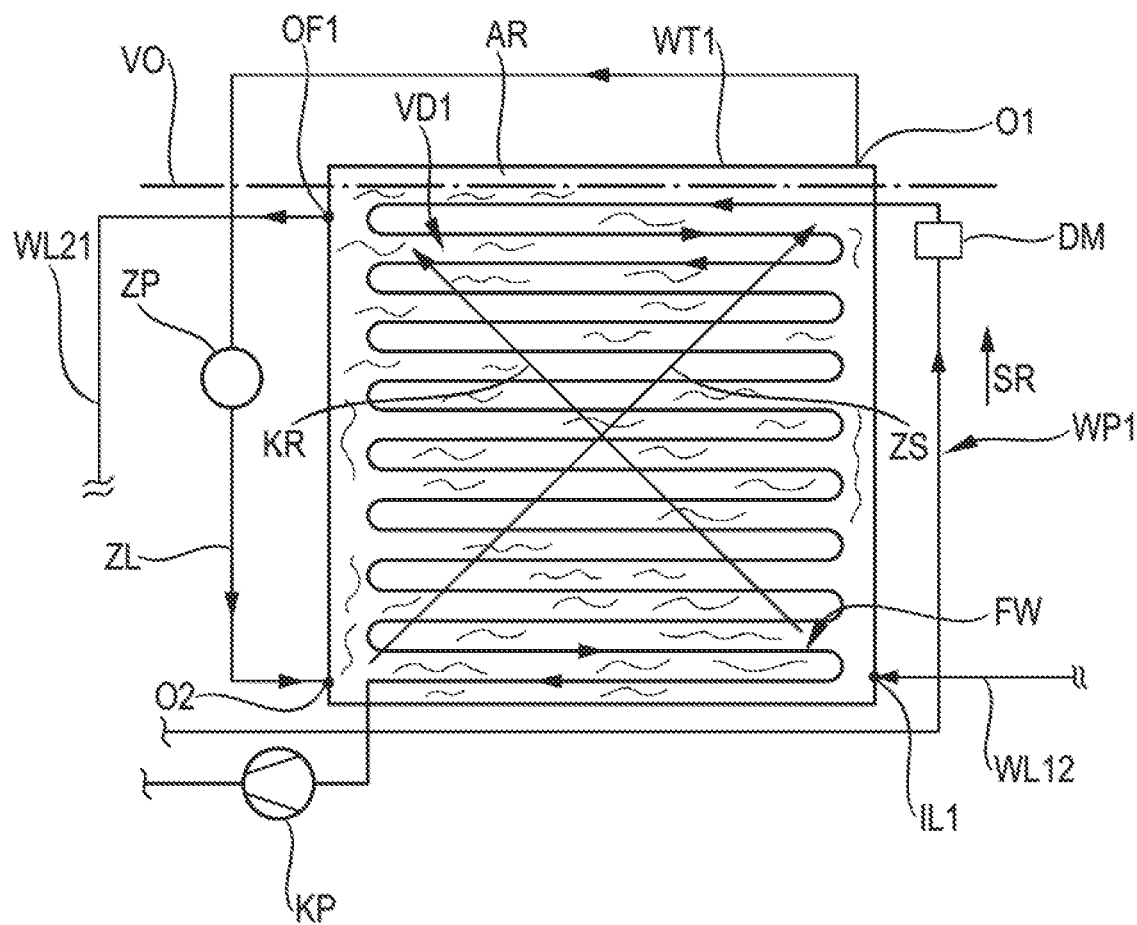
FIG. 11 shows a side view of the fill reservoir from FIG. 1.

The evaporator VD1 is in particular within the fill space of the fill reservoir provided for filling with liquid fresh water FW, in other words it is immersed in the fresh water FW stored in the fill container. The tubes of the evaporator VD1 preferably extend essentially over the entire width and height of the surface of the side wall SW1 bounded by the fill reservoir. This is illustrated in FIG. 11, which shows a side view of the fill reservoir WT1, in other words viewed from the side when looking perpendicular to the side wall SW1. The evaporator VD1 extracts heat energy QP1 from the quantity of fresh water introduced into the fill reservoir WT1. This can include the sensible heat and/or latent heat of the quantity of fresh water stored in the fill container.

The fill reservoir WT1 is configured as an open water storage unit and not as a closed water storage tank. The open water storage unit is characterized in particular in that it is filled one or more times per wash cycle with preferably decalcified fresh water FW* at inflow temperature TWT* by way of the fresh water feed apparatus ZLV and in that a quantity of fresh water FW required for the respective wash sub-cycle of a wash cycle to be performed is taken from it one or more times and fed by way of the discharge apparatus ALV to the wash container SB to be used there for the respective wash sub-cycle to be performed.

It can be particularly advantageous for the fill reservoir to be configured as an overflow storage unit as in the exemplary embodiment here in FIG. 1. If new, decalcified fresh water FW* is fed to the fill reservoir WT1 through its lower inlet opening IL1 by way of the fresh water feed apparatus ZLV, the water level of the mixed water, formed from the quantity of water already present in the fill reservoir and the newly fed in quantity of fresh water, rises above the lower edge of the upper outlet opening OF1 so that water flows automatically from the upper outlet opening OF1 by way of the discharge line WL21 of the discharge apparatus ALV into the wash container SB. An "overflowing" of the fill reservoir results in that the quantity of fresh water flowing into the fill reservoir pushes a corresponding quantity of mixed water, in other words of roughly the same size, out of the fill reservoir by way of its upper outlet opening OF1. A pump or valve is then not required in the discharge apparatus ALV to take water out of the fill reservoir. The fill volume of the fill reservoir provided also remains completely filled with water during the entire wash cycle. The fill reservoir WT1 is therefore available with its full storage volume either as a fresh water filling means for the wash container, a heat reservoir for the heat pump, an absorbing or collecting means for lost heat from the wash container in every water-conducting wash sub-cycle, for example VG, RG, ZG, KG, and/or even during the final drying cycle TG, over the entire duration of the full wash cycle SG and/or optionally as a heat exchanger with cooling function for assisting drying for the drying cycle completing the wash cycle, in other words it is always fully functional.

In some instances the upper outlet opening OF1 and/or discharge line WL21 can be replaced by differently configured overflow means, which allow an adequate, in other words equal, quantity of water to be pushed out of the fill reservoir and to flow into the wash container, by introducing a specified quantity of fresh water into the fill reservoir therefrom.

Alternatively a drain valve can be provided in some instances in the discharge line WL21 or at the outlet, in other words in the outlet opening OF1, of the fill reservoir. This drain valve can preferably be opened or closed by the monitoring facility CO by way of a control line. To take a specified quantity of water ΔWMi where i=VG, RG, ZG, KG from the fill reservoir WT1 said drain valve is opened by way of the control line by means of a control signal, otherwise it remains closed. (This variant is omitted from FIG. 1 for the sake of the clarity of the drawing). In particular it can be expedient for the inlet valve ZV and the drain valve to be opened and closed at the same time from the monitoring facility CO by way of its control lines. This ensures that the fill reservoir WT1 is always full to the fill height VO provided, which corresponds to the maximum fill level in the fill reservoir provided for liquid water, over the entire wash cycle SG.

For example when the dishwasher is first brought into service the target fill volume of the fill reservoir WT1 present, which is provided for filling with liquid fresh water, can be filled completely full by way of the feed apparatus ZLV with fresh water FW that has flowed through the softening unit EV. Before the wash cycle of a dishwashing program to be performed is started, in particular before the heat pump WP1 is brought into operation for a wash sub-cycle with wash liquid to be heated in the wash container, the target fill volume of the fill reservoir provided for liquid fresh water is generally speaking expediently filled full of softened fresh water FW* from the feed apparatus ZLV. In this process the water level reaches the target fill level assigned to the target fill volume for liquid water in the fill container WT1. The target fill volume preferably corresponds essentially to the full internal volume of the fill reservoir, as bounded by its container walls. The associated target fill level is then roughly in the region of the top wall of the fill reservoir, in other words when filled full the fill reservoir is filled full of water from its bottom to the region of its top. The fill reservoir WT1 advantageously extends outside on the side wall, for example SW1, of the wash container, which is provided in some instances with a coating layer, for example BI, essentially from its lower end to its upper end.

It can be particularly favorable for the maximum target fill level VO advantageously to be defined, as here in the exemplary embodiment in FIG. 1, with a free space gap roughly below the upper edge of the fill reservoir WT1, so that a free space volume AR is present. This is expediently dimensioned such that it can absorb the growth in the volume of the water when ice/icy water forms. Therefore an additional free space AR is provided above the maximum target fill level VO provided in the fill container WT1, it being possible for icy water/ice, which is produced in some instances from the fresh water FW stored in the fill reservoir WT1 during operation of the heat pump WP1 due to the extraction of heat QP1 (sensitive and latent heat) by means of the evaporator VD1, to expand into this. Generally speaking in addition to the target fill volume provided for the softened, liquid fresh water FW* flowing into the fill reservoir at an inflow temperature TWT* of around 15° C., the fill reservoir also expediently has a reserve space or empty space for the growth of volume, by which the original volume of a given quantity by weight of liquid water increases during the phase change to icy water/ice. This reserve space can also be provided in a different manner, for example if the fill container has a flexible or elastic and therefore yielding sheath, which expands due to the resulting shear force as ice forms.

The dishwasher GS has an, in particular electronic, monitoring facility CO, which controls and/or regulates one or more components of the dishwasher for the performance of one or more dishwashing programs. It converts the various phases or program sub-steps of a respective dishwashing program to be performed to one or more water-conducting wash sub-cycles and a final drying cycle of a wash cycle. It can preferably be configured as a sequence controller, which carries out control operations but can optionally also manage regulation operations as well if required.

In the exemplary embodiment in FIG. 1 here the monitoring facility CO is actively connected to the following components in particular by way of signal or control lines and/or data lines (shown with a dot/dash line in FIG. 1):

To actuate an inlet-side inlet valve ZV of the feed apparatus ZLV, the monitoring facility CO is connected thereto by way of a signal line SL1. It can send one or more control signals to the inlet valve ZV by way of the signal line SL1, in particular to determine the time sequence of its opening and/or closing states. It also controls and/or regulates the heat pump WP1, in particular its compressor KP, by way of at least one signal line SL2. It sends one or more control signals by way of the signal line SL2 preferably to predetermine a time sequence for activation and deactivation states and/or at least one other operating parameter, for example the rotation speed of the compressor KP, for the compressor. In some instances the monitoring facility CO can additionally or independently hereof transmit commands to the pressure reduction means DM by way of a signal line (not shown in FIG. 1), thus influencing the temperature of the evaporator VD1. A signal line SL3 also passes from the monitoring facility CO to the circulating pump UP in order to monitor its operating sequence by means of one or more control signals, in particular to predetermine the activation and deactivation times of the circulating pump and/or to control and/or regulate the rotation speed of the circulating pump. The drain pump EP similarly receives one or more control signals from the monitoring facility CO by way of a signal line SL4 to monitor its operating sequence.

As in the exemplary embodiment in FIG. 1 here, at least one detection means DV can also be provided, to detect at least one parameter characterizing the respective heat energy content of the fill reservoir. The parameter used can be in particular the temperature TWT in the interior space of the fill reservoir. A measurement signal T' corresponding to the respective temperature TWT present can be transmitted by the detection means DV, in this instance in particular by a temperature sensor, to the monitoring facility CO by way of a measurement line or data line SL5 (shown with a dot/dash line in the figure). The monitoring facility CO can preferably use this parameter characterizing the heat energy content of the fill reservoir to monitor, in particular control and/or regulate, the work sequence, in particular the activation and/or deactivation states, of the heat pump WP1. In addition to or independently thereof the monitoring facility can influence the thermodynamic processes in the fill reservoir and/or in the wash container in a specific manner. For example by sending a control or regulation signal by way of the signal line SL1 to the inlet valve ZV it can predetermine the quantity of fresh water to be taken from the fill reservoir for the respective water-conducting wash sub-cycle and the quantity of fresh water to be added to the fill reservoir. In addition to or independently of the temperature TWT of the quantity of fresh water in the fill reservoir WT1, the temperature TSB in the wash container SB, which indirectly characterizes the heat energy content of the fill reservoir, can serve as the parameter characterizing the heat energy content of the fill reservoir—in this instance indirectly. The temperature TSB can expediently be determined by means of a temperature sensor in the wash container and a corresponding measurement signal can be transmitted to the monitoring facility CO by way of a signal line. Such a temperature sensor assigned to the wash container SB and the associated signal line are omitted from FIG. 1 for the sake of the clarity of the drawing.

The wash cycle of a dishwashing program to be performed preferably comprises one or more water-conducting wash sub-cycles for washing the dishes to be washed in each instance in the wash container and a final drying cycle to dry the dishes that have previously been made wet in the one or more water-conducting wash sub-cycles. During at least one water-conducting wash sub-cycle wash liquid in the wash container is heated to a required minimum temperature. In particular the respective wash cycle, for example SG, can comprise the water-conducting wash sub-cycles pre-rinse cycle VG, cleaning cycle RG, intermediate rinse cycle ZG and final rinse cycle KG, which follow one another in a time sequence (see FIG. 2). For the pre-rinse cycle VG just softened water is preferably used as the wash liquid to be applied to the dishes to be cleaned in the wash container. For the cleaning cycle RG softened water with cleaning agent is used as the wash liquid in the wash container. For the intermediate rinse cycle ZG clean softened water is sufficient as the wash liquid in the wash container. For the final rinse cycle KG rinse aid, in other words a tension-lowering agent to reduce the surface tension of the water, is added to the softened water and used as the wash liquid in the wash container. In some instances one or more of these wash sub-cycles, for example the intermediate rinse cycle ZG or pre-rinse cycle VG, can be omitted or even performed a number of times. During the respective water-conducting wash sub-cycle, e.g. VG, RG, ZG, KG, the circulating pump UP is brought into operation at least temporarily by the monitoring facility CO by means of one or more control or regulation signals by way of the signal line SL3, so that the quantity of wash liquid introduced into the wash container in each instance is sprayed by the one or more spray facilities, e.g. OS, US, in the interior space of the wash container SB. During an end segment of the respective water-conducting wash sub-cycle the circulating pump UP is expediently deactivated by the monitoring facility CO and the drain pump EP is activated by the monitoring facility CO. It is however also possible for the operation of the circulating pump UP and the operation of the drain pump EP to overlap partially or completely in respect of time.

For the cleaning cycle RG and the final rinse cycle KG it is necessary to heat the wash liquid introduced into the wash container in each instance to a specifically assigned minimum temperature RT, KT, which requires the provision of a quantity of heat energy sufficient for the purpose by a heating means. The heating of the wash liquid during the final rinse cycle KG also preferably serves here to heat the dishes and air in the interior space of the wash container to such a degree that water droplets remaining on the dishes evaporate due to the inherent heat of the dishes and are absorbed by the heated air in the wash container in the subsequent drying cycle that completes the wash cycle and there is a sufficiently large difference between the temperatures of the respective wall of the wash container and the air that is laden with moisture after the final rinse operation that moisture from the air condenses on the wall of the wash container that is cooler than said air and the dishes. In a conventional dishwasher a water heater is generally operated in the liquid circulation circuit of the wash container for the respective heating operation, said water heater operating according to the principle of an electric resistance heater.

Figure 2:
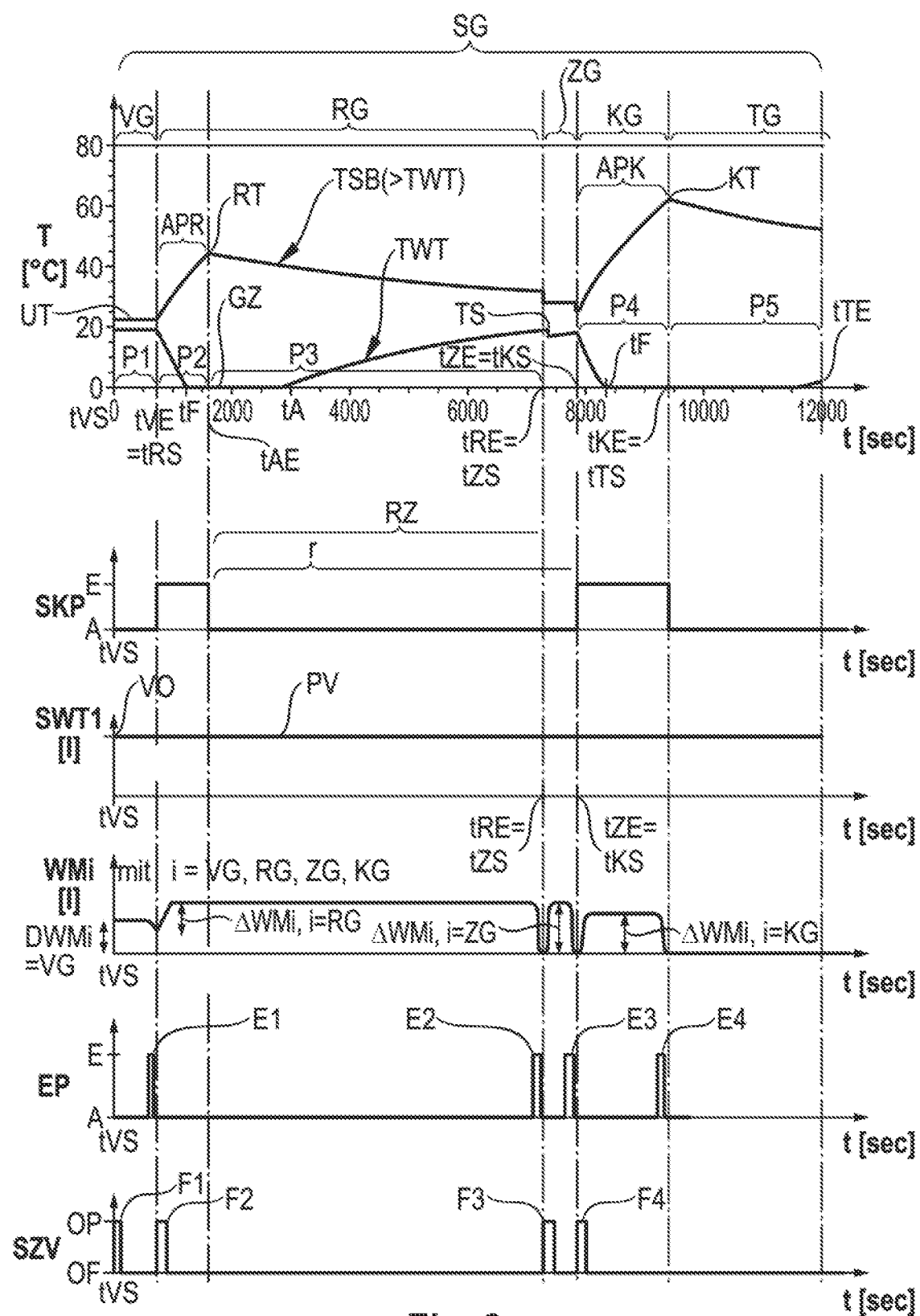
FIG. 2 shows time diagrams for different components of the dishwasher in FIG. 1 to illustrate the pattern of the wash cycle of a dishwashing program to be performed.

To save electrical energy, according to the inventive principle the heat pump WP1 is now provided as a heating means. According to one advantageous variant only, in other words exclusively, the heat pump WP1 is provided as heating means to heat wash liquid in the wash container. It serves to heat the wash liquid in the wash container during the cleaning cycle RG and during the final rinse cycle KG of a wash cycle SG to be performed by way of example. FIG. 2 shows the temperature pattern TSB in the wash container SB and the temperature pattern TWT in the fill reservoir WT1 assigned thereto, the activation/deactivation pattern SKP of the compressor KP, the pattern PV of the fill level of stored water FW in the fill reservoir WT1, the pattern over time SWT1 of the fill level of water in the fill reservoir WT1, the quantities of wash liquid WMi where i=VG, RG, ZG, KG for the different wash sub-cycles VG, RG, ZG, KG in the wash container, the activation/deactivation pattern SEP of the drain pump EP, and the activation/deactivation pattern SZV of the inlet valve ZV, for this wash cycle SG matched to one another in time over time t (in seconds). The activation state of the drain pump is shown as E, its deactivation state as A. Correspondingly the active operating state of the compressor KP of the heat pump is shown as E and its deactivation state as A. The opening state of the inlet valve ZV is symbolized as OP and its closing state as OF.

At the start, in other words at the start time point tVS of the new wash cycle SG to be performed the fill reservoir WT1 is filled full of fresh water FW to its maximum target fill level VO. For example, 6 l water is present therein. Filling has expediently already taken place during the last water-conducting wash sub-cycle and/or drying cycle of the temporally preceding, earlier wash cycle. This means that the waiting period between the preceding wash cycle and the new subsequent wash cycle SG to be performed can in particular suffice for the fresh water FW stored in the fill reservoir to have been preheated by absorbing ambient heat to around room temperature UT, for example 23° C., at the site of the dishwasher. For the pre-rinse cycle VG at start time point tVS during an initial fill sequence a quantity of water WMi where i=VG, for example between 2.0 l and 3.5 l, required specifically for pre-rinsing in the wash container, is taken, in particular drained, by way of the discharge facility ALV from the fill reservoir WT1 (at for example approx. 23° C. ambient temperature) into the dishwasher container or wash container SB, which is still empty at start time point tVS. Immediately after this is taken, or preferably with a time overlap, in particular roughly simultaneously, with it being taken, the fill reservoir is topped up with a top-up quantity of fresh water FW* from the feed apparatus ZLV, preferably corresponding to the quantity of water WMi where i=VG, taken from the fill reservoir by means of the discharge apparatus ALV. The residual quantity of water, minus the quantity of water WMi where i=VG, taken, which is preheated approximately to ambient temperature UT, is therefore immediately supplemented or replaced by a new additional quantity of fresh water FW* coming in with an inflow temperature TWT*, for example of around 15° C. If, as here in the exemplary embodiment in FIG. 2, essentially at the same time, in other words simultaneously or synchronously, as a quantity of water WMi where i=VG, for example of around 3.2 l, to be fed to the initially empty wash container SB, is taken from the fill reservoir WT1, a corresponding, in other words equal, quantity of fresh water FW* is fed to the fill reservoir by way of the feed facility ZLV, the overall quantity of fresh water in the fill reservoir remains roughly constant, in other words the quantity of water FW in the fill reservoir has a roughly constant target fill level VO during the time segment tVE−tVS of the pre-rinse cycle VG. To feed this top-up quantity of fresh water FW* into the fill reservoir, the inlet valve ZV is opened by means of a control signal for a fill phase sent by the monitoring facility CO by way of the signal line SL1, as shown in the bottom time diagram SZV in FIG. 2 by a bar F1 from the time point tVS, which marks the opening state OP of the inlet valve ZV for an initial fill sequence or filling period. Due to the predetermined conditions at the site of the dishwasher and in the household fresh water network WN, the inflow temperature TWT* is generally lower than the ambient temperature UT and lower than the temperature TWT (>TWT*) of the stored water already introduced into the fill reservoir during the last preceding wash cycle, said stored water having reached ambient temperature after a sufficiently long waiting period in the fill reservoir. A mixed temperature, in the present example approx. 19° C. for example, results, between the temperature TWT*, for example 15° C., of the quantity of fresh water FW* flowing into the fill reservoir by way of the feed apparatus ZLV and the residual quantity of water in the fill reservoir which is roughly at ambient temperature UT=TWT. The temperature TWT of the quantity of fresh water FW stored in an intermediate manner in the fill reservoir and made up of the residual quantity of water already present in the fill reservoir before the start of the wash cycle SG and the top-up quantity of fresh water FW* newly fed into the fill reservoir is therefore somewhat lower at the start tVS and also during the pre-rinse cycle VG until its end time point tVE than the temperature TSB of the quantity of water WMi where i=VG introduced into the wash container SB. During the pre-rinse cycle VG the fill reservoir WT1 is heated slightly by the ambient heat and by the heat given off from the wash container SB. This time segment with a slightly rising segment of the temperature pattern TWT in the interior space of the fill reservoir WT1 is between the time points tVE and tVS in FIG. 2. During the time period or phase tVE–tVS of the pre-rinse cycle VG the circulating pump UP is activated by at least one control or regulation signal transmitted to it by the monitoring facility CO by way of the signal line SL3, at least temporarily, in particular with alternating activation and deactivation phases or continuously, so that the wash liquid WMi where i=VG present in the wash container SB is sprayed by way of the one or more spray facilities OS, US of the liquid circulation circuit of the dishwasher into the interior space of the wash container SB.

At the end of the pre-rinse cycle VG in some instances a sub-quantity, for example between 0.5 l and 1 l, or the entire quantity, for example 3.2 l, of the quantity of water WMi where i=VG present in the wash container for the pre-rinse VG is pumped out of the wash container in particular into a household waste water pipe by means of at least one final discharge sequence E1 of the drain pump EP, which has been switched from the deactivation state A to the activation state E for the purpose, by way of the waste water line WL6. To this end the drain pump EP is switched by the monitoring unit CO from the deactivation state A to the activation state E by means of a control signal by way of the signal line SL4. After the end of the discharge sequence E1 at time point tVE the drain pump EP is correspondingly switched back to its deactivation state by means of a control signal by way of the signal line SL4. The pre-rinse cycle VG therefore comes to an end at time point tVE. During this final discharge phase E1 of the pre-rinse cycle VG, while the drain pump EP is active, the circulating pump UP is expediently deactivated by means of a control signal transmitted by the monitoring facility CO by way of the signal line SL3. In some instances however it may also be favorable to operate the circulating pump UP and the drain pump EP with a partial or complete time overlap toward the end of the pre-rinse cycle VG.

The cleaning cycle RG follows at time point tRS=tVE. This requires a specific quantity of water WMi where i=RG in the wash container, for example between 3 l and 4 l, preferably around 3.5 l, which is to be brought to a desired target temperature, in other words final temperature RT, in particular between 40 and 50° C., preferably around 45° C., during an initial heating time segment APR=tAE–tRS. A sub-quantity of water ΔWMi where i=RG is taken from the fill reservoir by means of the discharge apparatus ALV and fed to the wash container SB, so an overall quantity of water WMi where i=RG desired for the cleaning cycle RG is present there. In the exemplary embodiment here, preferably at around the same time as this is taken, a roughly similar quantity of fresh water FW* with inflow temperature TWT* is fed to the fill reservoir WT1 by means of the feed apparatus ZLV. To this end its inlet valve ZV is switched to the opened state OP for an initial fill sequence duration from the time point tRS by the monitoring facility CO by means of a control signal by way of the signal line SL1, as shown in the flow diagram SZV in FIG. 2 by the bar F2. The water fill state therefore remains roughly constant in the fill reservoir at VO (see diagram SWT1 in FIG. 2), in other words the target fill volume in the fill reservoir for liquid water is filled full of water. After this top-up operation a mixed temperature results, in this instance around 18° C., for the quantity of mixed water in the fill reservoir, made up of the newly fed in top-up quantity of fresh water FW* with inflow temperature TWT*, in this instance around 15° C., and the residual quantity of water remaining in the fill reservoir WT1 after the sub-quantity of water ΔWMi where i=RG has been taken, which has a higher temperature TWT than the inflow temperature TWT* due to the absorption of ambient heat, at best being preheated to room temperature UT.

In the advantageous embodiment here the compressor KP of the heat pump WP1 is activated, in other words switched to activation mode E, by the monitoring facility CO by means of a control signal by way of the signal line SL2 advantageously at the start time point tRS of the cleaning cycle RG, in particular at the latest after the end of the top-up operation for the fill reservoir WT1, and operated for the time period tAE–tRS of the heating time segment APR, and switched back to the deactivation state A at time point tAE, During the time period tAE–tRS of the heating time segment APR the heat pump WP1 therefore initially operates actively, to heat the wash liquid in the wash container SB to the desired active temperature or final temperature RT, in this instance preferably between 40 and 45° C., preferably to around 45° C. This phase is marked as P1 in FIG. 2. During this heating time segment APR according to a first advantageous variant the compressor KP can preferably be activated permanently, in other words continuously. According to a second advantageous variant it can be favorable for the regulation of the temperatures at the evaporator VD1 and the condenser VF1 of the heat pump WP1 for the compressor KP to be switched, in particular clocked, by means of one or more control or regulation signals of the monitoring facility CO, such that it has temporally alternating deactivation and activation phases during the heating time segment APR. In FIG. 2 in the state pattern SKP of the compressor KP its active operation is shown simply by the constant activation state E during the heating time segment APR.

During the cleaning cycle RG the circulating pump UP is activated at least temporarily. To this end the monitoring facility CO sends the circulating pump UP one or more control or regulation signals by way of the signal line SL3. The circulating pump UP is expediently only deactivated during a final segment of the cleaning cycle RG and the drain pump EP is activated to pump away some or all of the quantity of wash liquid present in the wash container SB in each instance. In some instances however it may also be favorable to operate the circulating pump UP and the drain pump EP with a partial or complete time overlap toward the end of the cleaning cycle.

This first operating phase P1 of the heat pump WP1 during the heating time segment APR allows the evaporator VD1 to extract heat energy QP1 from the fresh water FW stored in the fill reservoir WT1, this then being "pumped" into the wash container SB as heat energy QP1* by means of the condenser VF1 together with the electrical energy used for compressor operation. The extraction of heat by means of the evaporator VD1 while the heat pump WP1 is operating causes the water FW stored in the fill reservoir to cool, as sensible and/or even latent heat is extracted from it. This cooling phase is marked as P1 in FIG. 2. The stored water FW in the fill reservoir can ultimately even freeze if all the latent heat contained in it is extracted. The fill reservoir thus forms an ice storage unit. In the exemplary embodiment here in FIG. 2 the stored water FW in the fill reservoir is cooled by the evaporator VD1 from around the time point tF to a temperature TWT of around 0° C. or even lower so that icy water/ice forms.

It is particularly energy-efficient, in other words energy-saving, if the heating operation for the quantity of water ΔWMi where i=RG provided for the cleaning cycle RG in the wash container to the required active temperature RT is brought about only, in other words exclusively, by means of the heat pump WP1. This is shown in the exemplary embodiment in FIG. 2.

Contrary to the above exemplary embodiment it can in some instances be expedient, to reach the respectively required final temperature RT within the predetermined heating time period APR=tAE−tRS, for an electric heater, in particular a water heater or air heater, to be provided in addition to the heat pump WP1, being brought into operation by the monitoring facility CO in addition to the heat pump WP1 to heat the interior space of the wash container during the cleaning cycle RG, in particular the quantity of wash liquid ΔWMi where i=RG introduced into the wash container for the cleaning cycle RG, to the required final temperature or active temperature RT. To assist with the heating of air and/or wash liquid in the wash container to the desired final temperature or active temperature for the cleaning cycle RG, it can be advantageous in particular for the additional electric heater to be operated partially or completely parallel to the heat pump, in other words with a time overlap. The additional heater can in particular also be clocked. In addition to or independently hereof it can in some instances be expedient for the additional heater only to be brought into operation by the monitoring facility CO after a heating time period of the heat pump WP1, in other words after its deactivation, in order to then heat the wash liquid in the wash container, which has already been preheated by the heat pump, to the required final temperature RT in a separate phase. In both the above advantageous variants the additional heater can be smaller in respect of electric power consumption and heat output than in a conventional dishwasher which has no heat pump, just a conventional water heater. This can mean a saving in electrical energy compared with a conventional dishwasher (without heat pump and with conventional heater) despite the simultaneous operation or the succeeding operating phases of heat pump and conventional heater.

After the heating time segment or after the heating time period APR of the cleaning cycle RG in the exemplary embodiment in FIG. 2 the heat pump WP1 is deactivated when the interior space of the wash container SB and therefore also the wash liquid present there has reached the target temperature RT. After the time point tAE the compressor KP is switched to the deactivation state A by a control signal transmitted to it by the monitoring facility CO by way of the signal line SL2. A target temperature of at least 40° C., in particular between 44° C. and 50° C., is preferably selected for the cleaning cycle RG so that cleaning agent added to the water can act in an unimpaired manner to eliminate soiling from the dishes chemically.

After this heating time segment APR with circulating operation of the circulating pump UP, this latter continues to be operated during a subsequent wash phase NW for a residual time period RZ=tRE−tAE of the cleaning cycle RG, so that the wash liquid heated with the aid of the heat pump is sprayed in the interior space of the wash container by way of the one or more spray apparatuses, for example OS, US.

Alternatively it is also possible for the circulating pump UP to be deactivated or operated at a reduced rotation speed (compared with its working operating rotation speed for spray operation of the one or more spray facilities) during the heating time segment APR. As a result the quantity of water present in the wash container SB is present largely or completely at a collection point, for example in a limited space in the pump sump PS, and not sprayed throughout the entire interior space of the wash container, which improves or favors, in particular speeds up or makes more energy-saving, its heating to a desired final temperature RT, compared with when the circulating pump UP operates at its intended operating rotation speed immediately from the start time point tRS of the cleaning cycle and the wash liquid is sprayed throughout the entire interior space of the wash container by way of the one or more spray facilities. This is because the heating of the quantity of water that is only locally present in the wash container or its liquid circuit reduces heat losses by way of the walls of the wash container. In this exemplary embodiment the circulating pump UP is only activated for the subsequent wash phase NW and operated at the operating rotation speed required for the spray operation of the spray facilities after the end of the heating time segment.

After the heating time segment APR with the first heat pump operation P1, in which the quantity of wash liquid WMi where i=RG in the wash container has been heated to the desired final temperature RT with the aid of the condenser VF1 of the heat pump WP1, the compressor KP of the heat pump WP1 is deactivated, in other words taken out of operation, by a control signal transmitted by the monitoring facility by way of the signal line SL2. For the remaining time period RZ=tRE−tAE of the cleaning cycle RG a subsequent wash phase NW follows, in which the thus heated quantity of wash liquid WMi where i=RG in the wash container SB is fed to the one or more spray facilities OS, US by means of the activated circulating pump UP and sprayed by way of these in the interior space of the wash container. During this subsequent wash phase NW the heat pump and/or another heater, in particular a water heater, is/are deactivated. This results in slow cooling of the wash liquid in the wash container, as heat energy from the wash container escapes in particular by way of its walls, for example SW1. In FIG. 2 therefore the temperature TSB in the wash container drops continuously from the maximum temperature RT occurring at the end time point tAE of heating during the cleaning cycle RG, here around 45° C., to a relatively lower temperature value, here around 30° C., at the end time point tRE of the cleaning cycle RG.

The heat insulation element IS1 between the coating layer, in particular the bitumen layer BI, applied to the outside of the side wall SW1 and the wall WI1 of the fill reservoir WT1 facing the wash container and making contact therewith is expediently configured such that it acts as a thermal barrier or boundary or brake for the heat energy QP1* introduced into the wash container SB by means of the condenser VF1 of the heat pump WP1. Generally speaking a multilayer insulation material system between the interior space of the wash container and the interior space of the fill reservoir is therefore formed between the interior space of the wash container SB and the interior space of the fill reservoir WT1 by the wall, for example SW1, of the wash container, to the outside of which the fill reservoir is attached, by the coating layer, in particular the bitumen layer BI, applied to the outside of this wall of the wash container, by the heat insulation element IS1 resting against this coating layer and by the wall of the container of the fill reservoir facing the wash container, with such poor thermal coupling that during the ongoing operation of the heat pump WP1 (in relation to a desired heating time segment) more heat energy QP1* can be pumped overall into the wash container SB than is generally lost as heat energy QD due to the transfer of heat from the wash container.

On the other hand this multilayer insulation material system or heat insulation system still provides poor thermal coupling between the interior space of the wash container SB and the interior space of the fill reservoir WT1 so that lost heat QD due to the transfer of heat from the interior space of the wash container through the insulation material system is absorbed by the fresh water stored in the fill reservoir WT1 and can be pumped back into the wash container by the heat pump WP1 when it comes back into operation, in particular for the second time. It only permits a temporally delayed, in other words constricted or reduced, passage of heat from the wash container back into the fill reservoir. The fill reservoir therefore also serves as a means of absorbing or collecting lost heat QD that escapes due to a transfer of heat by way of the respective wall, for example SW1, of the wash container SB to the outside of which the fill reservoir WT1 is attached. This advantageously allows heat regeneration by a heat circulation circuit, which comprises the fill reservoir as heat source, the heat pump as transport means for the heat pumped out of the fill reservoir, the wash container as heat sink and the single-layer or multilayer insulation material system between the interior space of the wash container and the interior space of the fill reservoir as thermal coupling means with retarding, in other words slowing function, for heat transfer from the interior space of the wash container into the interior space of the fill reservoir.

The greater the difference between the temperature TSB present in the wash container and the temperature TWT present in the fill reservoir, in particular at the end tAE of the heating time segment APR, the greater the heat discharge flow QD through the insulation material system (when viewed from the interior of the wash container outward into the fill reservoir) during the subsequent wash phase NW. The greater the difference between the temperature TWT of the fill reservoir present in the fill reservoir at the end of the heating time segment APR and the relatively higher ambient temperature UT, the greater the heat flow from the environment into the fill reservoir for its thermal replenishment.

In the subsequent wash phase NW of the cleaning cycle RG no more heat energy QP1* is fed to the quantity of wash liquid in the wash container due to the deactivation of the heat pump WP1 but a lost portion of the heat energy QP1* pumped into the wash container during the first operating phase P1 of the heat pump WP1 escapes during the subsequent wash phase NW from the interior space of the wash container SB through the insulation material system, which is formed (when viewed from the inside out) by the wash container side wall SW1, the coating layer BI applied to the outside thereof, the heat insulation element IS1 with poor thermal coupling attached to the coating layer BI and the wall WI1 of the fill reservoir WT1 which faces the wash container and is in contact with the heat insulation element IS1, into the stored water FW in the fill reservoir WT1. This heat flow QD, which penetrates through the insulation material system from the interior space of the fill reservoir WT1, heats the stored water FW, which was previously cooled significantly, in particular to below 4° C., in the fill reservoir during operation of the heat pump WP1 during the heating time segment APR, up again. In particular icy water/solid ice, which may have formed in the fill reservoir WT1 due to the extraction of heat energy by means of the evaporator VD1 during the heating time segment APR during heat pump operation, is thawed, in other words regenerated to become liquid water.

The stored water FW in the fill reservoir WT1 can also be heated after the heat pump WP1 has been deactivated at the end of the heating time segment APR in particular by ambient heat, as the temperature TWT of around 4° C. or less then present in the stored water FW in the fill reservoir is lower, preferably between 10° C. and 20° C. lower, than the ambient temperature UT of generally around 23° C. at the site of the dishwasher, for example in a kitchen. This temperature difference brings about a heat flow QA from the environment into the fill reservoir. In the exemplary embodiment in FIG. 2 the stored water FW in the fill reservoir WT1 at the end tRE of the cleaning cycle RG preferably has a temperature of around 15° C.-20° C., in particular approx. 19° C. In the exemplary embodiment in FIG. 2 the icy water/solid ice starts to thaw from time point tA, which here is preferably around 1000 sec after the end tAE of the heating time segment APR.

Because the temperature TWT of the stored water FW in the fill reservoir WT1 is always lower than ambient temperature UT during the subsequent wash phase NW, there is little or no transfer of heat from the wash container to the environment at the wall of the wash container to the outside of which the fill reservoir is attached. This is particularly advantageous, as it allows the electrical energy used per wash cycle to be further reduced.

If like the side wall SW1, to the outside of which the fill reservoir WT1 is attached, one or more fill reservoirs are attached to a number of walls of the wash container, said fill reservoirs being used as thermal energy sources like the fill reservoir WT1, heat energy being extracted therefrom by at least one evaporator of at least one heat pump, heat losses to the environment from the wash container, which was heated during the first heat pump operation, for example P1, can be further reduced. It is particularly advantageous if each fill reservoir is operated as an ice storage unit as then the sensible heat energy and latent heat energy contained in the stored water can be extracted by the respectively assigned evaporator of at least one heat pump and can be used to heat the interior space of the wash container, in particular treatment water or wash liquid in the interior space of the wash container.

In addition to or independently thereof it can in some instances be favorable for regeneration, in other words for heating the stored water FW cooled in the fill reservoir during the first heat pump operation in heating time segment APR to a temperature TWT below 4° C., in particular around 0° C., or for melting or thawing the stored water FW that has even solidified to ice in the fill reservoir during the first heat pump operation in heating time segment APR, if the monitoring facility CO opens the inlet valve ZV by means of a control signal by way of the control line AL1 and allows new fresh water from the household water network WN with an inflow temperature TWT*, in particular of around 15° C.-20° C., to flow into the fill reservoir, as long as this is higher than the temperature TWT in the fill reservoir WT1. So that the fill reservoir can accommodate this new fresh water FW* being fed in by way of the feed facility ZLV, it is expedient for the fill reservoir to have a correspondingly large fill volume or capacity. It can be advantageous here to feed in fresh water FW with an inflow temperature TWT* a number of times during the subsequent wash phase NW, in other words to feed it into the fill reservoir in a number of feed phases with waiting periods in between, in particular as long as the temperature TWT of the liquid and/or frozen water in the fill reservoir WT1 is lower than the inflow temperature TWT*(>TWT).

It is particularly favorable in respect of processes, if—as in the exemplary embodiment in FIG. 2—the ice storage unit formed by the fill reservoir after the first heat pump operation P1 is preferably regenerated solely by the lost heat QP1 from the wash container and in some instances also by the ambient heat QA. This can thaw the icy water/solid ice that can be formed in the fill reservoir WT1 by the extraction of heat energy by means of the evaporator VD1 after the first heat pump operation and bring it to a temperature TWT, which corresponds to a sufficiently high heat energy content in the stored water for a subsequent second heat pump operation. There is no regeneration of the fill reservoir by feeding in fresh water here.

During an end segment before the end time point tRE of the cleaning cycle RG the quantity of liquid WMi where i=RG present in the wash container SB is pumped away by means of the drain pump EP, preferably completely, in at least one discharge sequence. To this end the monitoring facility CO transmits a control signal to the drain pump EP by way of the control line SL4 to initiate the discharge sequence E2 (see time diagram SEP in FIG. 2). Before the discharge sequence E2 or with a partial time overlap therewith the circulating pump UP receives the instruction from the monitoring facility CO by way of the signal line SL3 to terminate its circulating operation so the spraying of wash liquid by way of one or more spray facilities OS, US is stopped. As soon as the soiled cleaning liquid WMi where i=RG is pumped out of the wash container SB by means of the drain pump EP at time point tRE, the inlet valve EZ is opened by the monitoring facility CO by means of a control signal by way of the signal line SL1 for a specified inflow time period such that a desired quantity of fresh water can flow into the fill reservoir, bringing a correspondingly large quantity of water WMi where i=ZG into the discharge line WL21 from the fill reservoir to overflow or flow out through the outlet opening OF1. The wash container, which has previously been emptied at the end of the cleaning cycle RG, can be filled by way of this with a quantity of water WMi where i=ZG, as desired for the intermediate rinse cycle ZG following the cleaning cycle in time in the wash container. In the exemplary embodiment here the quantity of water ΔWMi where i=ZG fed to the wash container from the fill reservoir WT1 is selected to be for example between 2 l and 4 l. To terminate the fill operation for the fill reservoir and thus also to terminate the fill operation for the wash container, given the overflow nature of the fill reservoir, the inlet valve ZV is again closed by the monitoring facility CO. This fill operation is shown by the bar F3 in FIG. 2. The intermediate rinse cycle ZG is provided for the specified time period between the time points tRE (=tZS) and tZE. During this the quantity of water WMi where i=ZG is sprayed in the interior space of the wash container by way of the one or more spray facilities by means of the circulating pump which has been brought into operation. A quantity of water between 2 l and 4 l, in particular around 2.5 l, is preferably fed to the wash container SB from the fill reservoir. This is used to perform the intermediate rinse cycle ZG. When at the start time point tRE=tZS of the intermediate rinse cycle ZG fresh water FW* with the inflow temperature TWT* flows into the fill reservoir WT1 due to the opening of the inlet valve ZV, in the exemplary embodiment here in FIG. 2 it cools the water FW present in the fill reservoir somewhat, in particular by between 1° C. and 5° C., as its inflow temperature TWT*, in particular of around 15° C. to 18° C., is lower than the temperature TWT (>TWT*), in particular of around 19° C. to 22° C., of the stored water FW present in the fill reservoir at the end of the cleaning cycle RG. The mixed water produced by the feeding of fresh water FW* with the inflow temperature TWT* into the stored water FW present with the temperature TWT preferably has a mixed temperature of around 18° C.-21° C. in the exemplary embodiment. As the intermediate rinse cycle ZG proceeds, it warms up slightly by the end time point tZE compared with its initial temperature at the time start point tZS, as it absorbs lost heat from the wash container and/or heat from the environment. In the exemplary embodiment here in FIG. 2 its temperature TWT is preferably between 20° C. and 25° C. toward the end of the intermediate rinse cycle.

During the period tZE-tZS of the intermediate rinse cycle ZG the heat pump WP1 is deactivated, in other words the quantity of wash liquid WMi where i=ZG present in the wash container is not actively heated. During the time period tZE-tZS of the intermediate rinse cycle it only absorbs thermal heat energy passively due to the transfer of heat (no active heating) from the wash container walls heated previously during the cleaning cycle, the air heated previously in the wash container during the cleaning cycle and the dishes heated previously during the cleaning cycle. The temperature TSB in the interior space of the wash container is preferably between 30° C. and 38° C. during the intermediate rinse cycle ZG. Toward the end of the intermediate rinse cycle the monitoring facility CO sends an instruction to the drain pump EP by way of the signal line SL4 to drain some or all of the used wash liquid WMi where i=ZG from the wash container. The drain operation is shown by the bar E3 in the diagram SEP in FIG. 2. A fill quantity of around 2.5 l water is pumped out of the wash container by the drain pump here.

At the start time point tKE of the final rinse cycle KG following the intermediate rinse cycle ZG a quantity of water ΔWMi where i=KG is taken from the fill reservoir WT1 to increase the quantity of water remaining in the wash container after the intermediate rinse cycle ZG during partial discharge to a desired target quantity of water WMi where i=KG, or all the desired target quantity of water is fed in, if the wash container has been completely emptied by the drain pump EP at the end of the intermediate rinse cycle ZG, as in the exemplary embodiment in FIG. 2 here. When the fill reservoir is preferably configured as an overflow storage unit, the fill operation for the wash container is triggered by feeding to the fill reservoir WT1 a quantity of fresh water FW* corresponding to the desired quantity of water ΔWMi where i=KG to be fed to the wash container. To this end the inlet valve ZV is opened by the monitoring facility CO for a specified fill time period and then closed again by corresponding signaling by way of the signal line SL1. The inflow of fresh water FW* into the fill reservoir, which is already full to level VO, causes its fill level to rise above the lower edge of the outlet opening OF1, which is provided somewhat above the level VO in the upper region of the fill reservoir, so that water FW overflows out of the outlet opening OF1 of the fill reservoir and flows into the wash container. The quantity of water flowing into the wash container from the outlet opening OF1 of the fill reservoir by way of the discharge line WL21 and the inlet WI1L1 here corresponds essentially to the quantity of fresh water introduced into the fill reservoir. To heat the quantity of wash liquid WMi where i=KG in the wash container to a required target temperature KT, which is preferably selected to be higher than the target cleaning temperature RT, in particular to be at least 55° C., preferably around 60° C. as here, the heat pump WP1 is brought into operation, in other words activated, by the monitoring facility CO from the start time point tKS for a heating time segment APK, which lasts until the end time point tKE of the final rinse cycle. This is initiated by the monitoring facility CO by a control or regulation signal to the compressor KP of the heat pump WP1 by way of the control line SL2. The heat pump WP1 is thus brought into operation a second time here. This second heat pump operation is shown as P2 in FIG. 2. In the diagram SKP in FIG. 2 the activation of the compressor KP is shown by the change at the start time point tKS of the final rinse cycle KS from the "off" state A to the "on" state E. In the exemplary embodiment in FIG. 2 the compressor is taken out of operation again at the end time point tKE of the final rinse cycle KG, in other words it switches from the "on" state E to "off" A. During the second heat pump operation P2 the evaporator VD1 extracts sensible and/or latent heat QP1 from the stored water FW in the fill reservoir, this being pumped by the compressor VF1 to the condenser VF1 using electrical energy and being output by said condenser VF1 there into the wash container as heat energy QP1. As in the exemplary embodiment here, during the active operation of the heat pump WP1 in the time period tKE–tKS of the final rinse cycle KG from the time point tF freezing in particular results, in other words ice forms, in the stored water FW in the fill reservoir, when it is cooled by the evaporator VD1 preferably to below a temperature of 0° C. As here in the exemplary embodiment the heating of the wash liquid in the wash container to the desired target temperature KT is expediently achieved solely by means of the heat pump. In some instances it can be expedient, as set out above with reference to the cleaning cycle, for a conventional heater, which is configured as a resistance heater, to be activated parallel to the heat pump, to achieve the target temperature KT within the specified heating time segment APK. In contrast it can be expedient in some instances for the wash liquid in the wash container only to be heated actively by means of the heat pump WP1 during a first time segment of the heating time segment APK, for said heat pump then to be deactivated and for only the conventional heater, in particular water heater, to be activated later in time for the remaining, second time segment. This sequential division of the heating operation in particular means that the dishwasher is not subject to electrical overload. Toward the end tKE of the final rinse cycle KG the final rinse water, which has been brought to the desired target final rinse temperature KT, is pumped out of the wash container SB by means of the drain pump EP, as shown simply in the diagram SEP in FIG. 2 by a bar E4. A corresponding discharge signal is transmitted to the drain pump EP by the monitoring facility by way of the control line SL4.

At the end tKE of the final rinse cycle KG the stored water FW in the fill reservoir is significantly cooled, in particular to below 4° C., or has preferably become icy water, as in the exemplary embodiment here, or has even frozen to form solid ice. As a result the fill reservoir now forms a cooling surface on the wall SW1 of the wash container which is ready in the following drying cycle TG, which lasts during the phase from time point tKE=tTS to tK, to bring about the greatest possible temperature difference, in particular of at least 10° C., preferably between 15° C. and 60° C., between the temperature TSB of the moist warm air in the wash container and the temperature at the inner wall surface of the side wall SW1 of the wash container, to the outside of which the fill reservoir is attached in such a manner as to be in contact with the heat insulation element IS1 applied to the coating layer BI. The greater the difference between the temperature TWT in the fill reservoir and the temperature TSB in the wash container, the more efficient the condensation drying in the wash container, as an even greater heat flow QD then passes through the heat insulation element IS1, which is inserted as an intermediate material layer between the coating layer BI applied to the side wall SW1 and the wall WI1 of the fill reservoir facing the wash container. In particular a sufficiently large temperature difference for desired condensation drying can be maintained even longer between the temperature TSB of the moist warm air in the wash container and the temperature at the inner wall surface of the side wall SW1 of the wash container during the predetermined time period tTE–tTS of the drying cycle TG, as the fill reservoir remains at around 0° C., until all the ice has thawed, because the supply QD of heat from the wash container is used to melt the ice, in other words for the phase change from ice to liquid water in the fill reservoir. This makes drying more efficient than in a conventional dishwasher with a water tank attached to the outside of a side wall (without heat pump coupling), said water tank only being filled with fresh water with an around 15° C. inflow temperature from a household water line to assist with condensation drying.

A further drying improvement can result in particular if the heat pump WP1 continues to be operated over the entire time period tTE–tTS of the drying cycle TG that completes the wash cycle after the final rinse cycle KG. This is shown in FIG. 2 by the phase P3. In the diagram SKP the activation operation E for the compressor KP is shown with a dot/dash line. The cooling of the stored water FW in the fill reservoir WT1 actively brought about by the evaporator VD1 of the heat pump WP1 allows said stored water FW to be kept cool for longer, in particular over the entire duration of the drying cycle TG, at a low temperature, in particular 0° C. or lower, and at the same time the air in the wash container can be heated and dried by means of the condenser VF1, so that the difference between the temperature of the inner wall surface of the side wall SW1 and the temperature TWT of the moist warm air and dishes in the wash container is always sufficient for adequate condensation drying for a longer time period, in particular over the entire duration of the drying cycle. In particular the activated heat pump can always supply a temperature difference of at least 10° C., preferably between 15° C. and 60° C., between the temperature of the inner wall surface of the side wall SW1 and the temperature TWT of the moist warm air and the dishes in the wash container over the entire duration of the drying cycle. As the ongoing operation of the heat pump WP1 during the drying cycle TG means that the air in the interior space of the wash container is also heated by the condenser VF1 there, said air can absorb moisture from the dishes more efficiently, so said dishes are dried more efficiently. In particular it may suffice for the heat pump only to be operated actively for an initial time period of the drying cycle.

Figure 3:
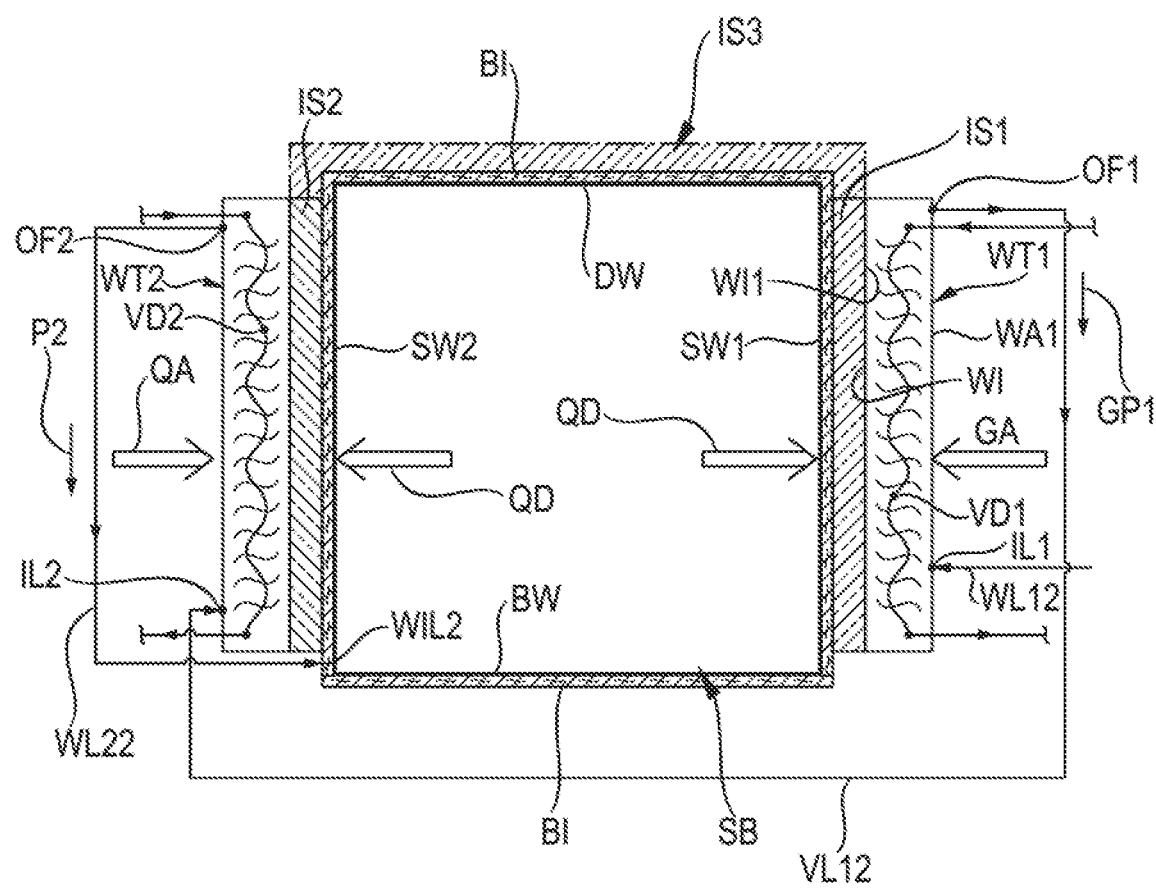
FIGS. 3, 4 show two advantageous variants of the dishwasher in FIG. 1.

FIG. 3 shows an advantageous variant of the dishwasher in FIG. 1. In the same way as the first fill reservoir WT1, which is configured as an overflow storage unit, is attached to the first side wall SW1, a second fill reservoir WT2 is similarly attached in the manner of an overflow storage unit to the second side wall SW2 of the wash container SB, which is opposite the first side wall SW1. A coating layer, in particular a bitumen layer BI, is applied to the outside of the second side wall SW2 to deaden sound. Over this in surface contact is a heat insulation element IS2 which corresponds to the first heat insulation element IS1, in particular in respect of its material parameters. The second fill reservoir WT2 is attached to the outside of the coating layer BI and in surface contact therewith. In some instances the top wall and/or bottom wall BW of the wash container can be provided with a coating layer BI on the outside to deaden sound and an additional heat insulation layer IS3. This improves the thermal insulation of the interior space of the wash container, so that unwanted heat losses are largely prevented. An evaporator VD2 is also housed in the interior space of the second fill reservoir WT2. It is preferably completely enclosed by water when the second fill reservoir WT2 is filled full of water. The inlet IL2 of the second fill reservoir WT2 can preferably be connected to a dedicated fresh water feed apparatus on the inlet side in the same manner as the first fill reservoir. The evaporator VD2 can preferably be a component of a second heat pump, which is configured in a similar manner to the first heat pump WP1. Identical fill reservoirs on the two side walls of the wash container are then each provided with their own fresh water feed apparatus and water discharge apparatus as well as separately assigned and coupled heat pumps. This corresponds to a duplication of the fill reservoir/heat pump arrangement WT1/WP1 with associated fresh water feed apparatus ZLV and water discharge apparatus ALV in FIG. 1.

In one advantageous variant of this, to reduce parts, in the exemplary embodiment in FIG. 3 the overflow OF1 of the first fill reservoir WT1 is connected to the inlet IL2 of the second fill reservoir WT2 by way of a liquid connecting line VL12, so that the filling of the second fill reservoir WT2 with fresh water takes place parallel to the filling of the first reservoir WT1 with fresh water FW* by means of the feed valve ZV. The wash container SB is filled by way of the discharge line WL22, which is connected to the overflow OF2 of the second fill reservoir WT2 and lead to the inlet WIL2 of the wash container SB, with a quantity of liquid ΔWMi where i=VG, RG, ZG, KG required for the respective water-conducting wash sub-cycle. It can be expedient in particular for the second evaporator VD2 to be part of the heat pump WP1 with the first evaporator VD1. The first evaporator VD1 can thus be formed for example by a first segment and the second evaporator VD2 for example by a second segment of a common evaporator and its heat pump circuit.

In some instances it may be advantageous for a second water storage tank WT2* to be attached to the outside of the second side wall SW2 of the wash container SB, which is opposite the first side wall SW1 of the wash container SB, to which the fill reservoir or fill container WT1 is attached. The second fill container WT2* expediently covers as large a surface of the second side wall SW2 as possible. There is no heat pump coupled to this second fill reservoir WT2*, in other words there is no evaporator coupling. Its inlet IL2* is connected in a liquid-conducting manner, in other words fluidically in series, by way of a connecting line VL12* to the outlet OF1 of the first fill reservoir WT1. This design of an inventive dishwasher, which is different from the exemplary embodiment in FIGS. 1, 2 and the exemplary embodiment in FIG. 3, is shown schematically in FIG. 4 with a front view of the wash container. The second water storage tank WT2* here is in direct thermal contact with the outer coating layer, in particular bitumen layer BI, of the second side wall SW2. In contrast to the first side wall SW1 therefore there is no heat insulation element, such as IS1, between the water storage tank WT2* and the coating layer BI of the second side wall SW2. Unlike the first fill reservoir WT1 the outlet OF2 of the second fill reservoir WT2* is provided at its container base, in other words the second fill reservoir WT2* is not operated as an overflow storage unit like the first fill reservoir WT1 but as an outlet storage unit. To this end a valve AVE is provided at the outlet OF2 or in the liquid line WL22* leading from this to the inlet WIL2 of the wash container. It can be opened and closed by the monitoring facility CO by way of a control line SL6. During the water-conducting wash sub-cycles VG, RG, ZG, KG of the wash cycle SG the discharge valve AVE is switched to "open" so that the second fill reservoir WT2* does not store incoming water but simply lets the water FW being fed in from the first fill reservoir WT1 by way of the connecting line VL12* flow through into the wash container SB. In contrast for the drying cycle TG that completes the wash cycle the discharge valve AVE is closed and the second fill reservoir WT2* is filled, in particular filled full, with water from the first fill reservoir WT1. When the first fill reservoir WT1 is configured as an overflow storage unit, as in the exemplary embodiment in FIG. 1 and also here in the exemplary embodiment in FIG. 4, the feed valve ZV in the fresh water feed line WL11 is opened for this purpose so that water from the full first fill reservoir WT1 is pushed into the overflow opening OF1 and flows into the second fill reservoir WT2* by way of the connecting line VL12*. As the first fill reservoir WT1 contains significantly cooled water or icy water/solid ice from one or more wash sub-cycles preceding the drying cycle TG, for example the final rinse cycle KG, with heat pump operation, the fresh water fed in is cooled from its inflow temperature, of for example generally 15° C. The water flowing out of the overflow OF1 of the first fill reservoir therefore has a temperature that is significantly lower than the inflow temperature TWT* of the fresh water FW* being fed in. The second fill reservoir WT2* therefore also contains cold water, in particular cooled to 0° C.-10° C. As it is in direct contact with the outside of the coating layer BI of the second side wall SW2 without a heat insulation element, it cools the side wall SW2 particularly efficiently, providing greater assistance for the desired condensation drying in the wash container than in the first exemplary embodiment in FIG. 1.

Figure 4:
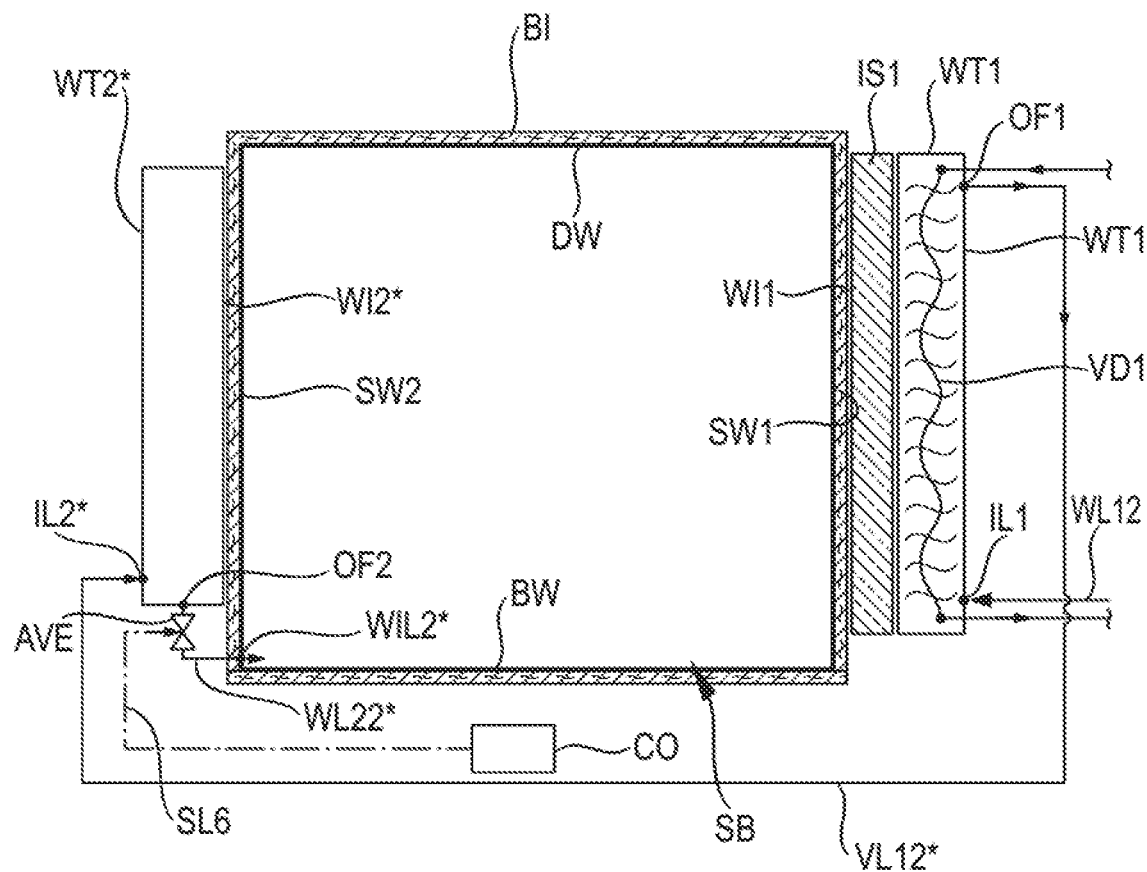
Figure 5:
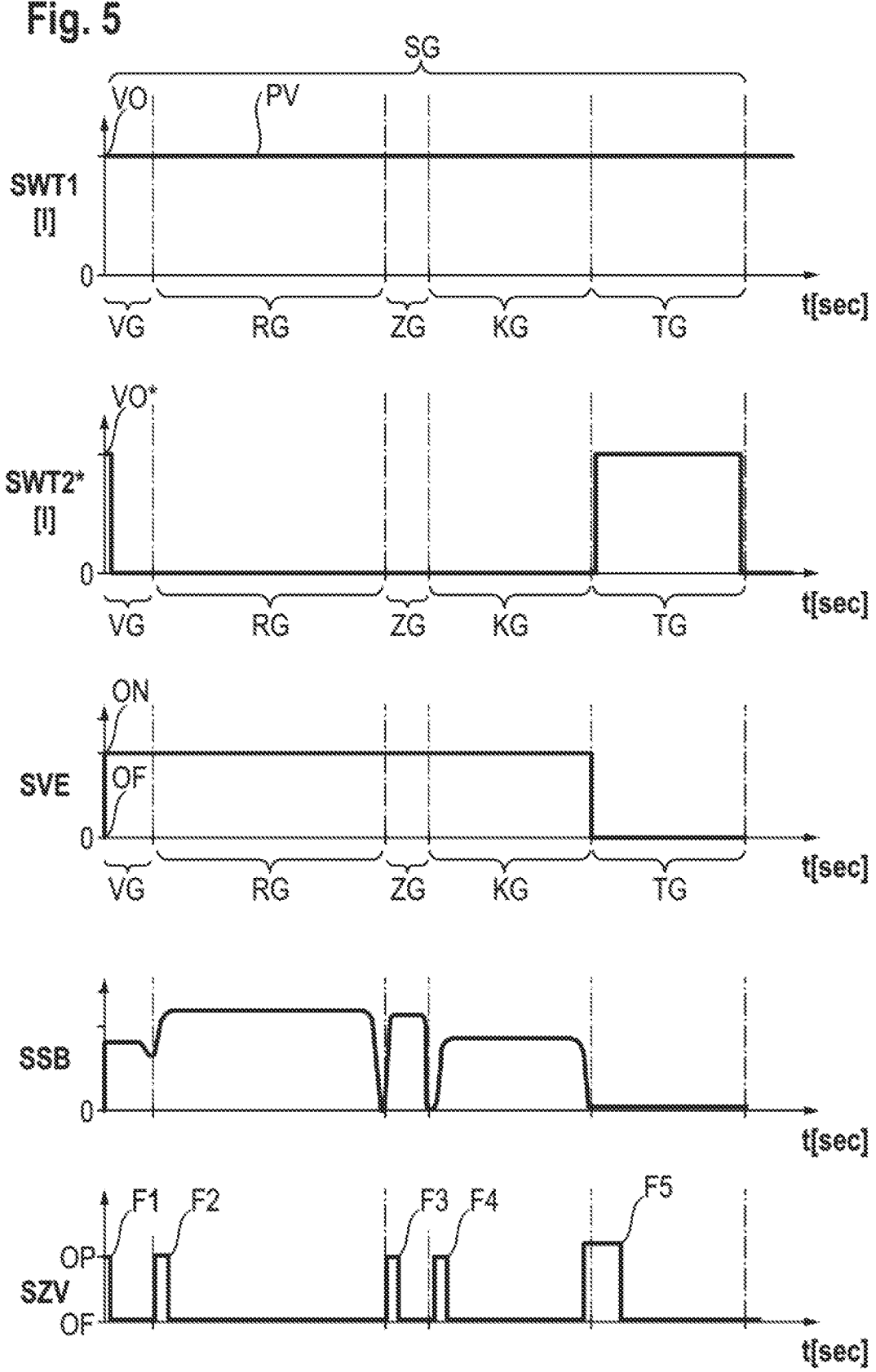
FIG. 5 shows time diagrams for different components of the dishwasher in FIG. 4 to illustrate the pattern of the wash cycle of a dishwashing program to be performed.

The time diagrams in FIG. 5 illustrate the associated sequence, which is different from FIG. 2, of the wash cycle SG of a dishwashing program of the modified dishwasher in FIG. 4. The function and mode of operation as well as the manner of filling the first fill reservoir WT1 correspond to those of the exemplary embodiment in FIG. 1. The time diagram SWT1 corresponds to the one in FIG. 2 and shows the pattern over time PV of the fill level of the stored water FW in the first fill reservoir WT1. The fill level is constant at the target full fill level VO over the entire duration of the wash cycle SG. FIG. 5 shows the time diagram SWT2* of the pattern over time of the fill level of the second fill reservoir WT2* in FIG. 4. This is empty during the water-conducting wash sub-cycles pre-rinse VG, cleaning RG, intermediate rinse ZG and final rinse KG and is only filled full to the maximum fill level VO* during the drying cycle TG. The diagram SVE shows the sequence over time of the switching states of the discharge valve AVE. It is opened during the wash sub-cycles VG, RG, ZG, KG, in other words in the "on" state ON and in its closed state OF during the drying cycle TG. The diagram SSB corresponds to the diagram WMi in FIG. 2 and serves to indicate which quantities of liquid are present in the wash container or pumped away in the pattern over time of the wash cycle SG.

The diagram SZV finally shows the open states OP and closed states OF the fresh water inflow valve ZV. In contrast to FIG. 2 the inflow valve ZV is now also opened for a fill phase F5 during the switch from final rinse cycle KG to drying cycle TG, to fill the second fill reservoir WT2* full of cooled water from the first fill reservoir WT1. It can be favorable—as set out above for the exemplary embodiments in FIGS. 1 and 2—for the heat pump WP1 to be switched to active during the drying cycle TG so that active cooling of the stored water in the first fill reservoir is carried out by the evaporator VD1 there.

Figure 6:
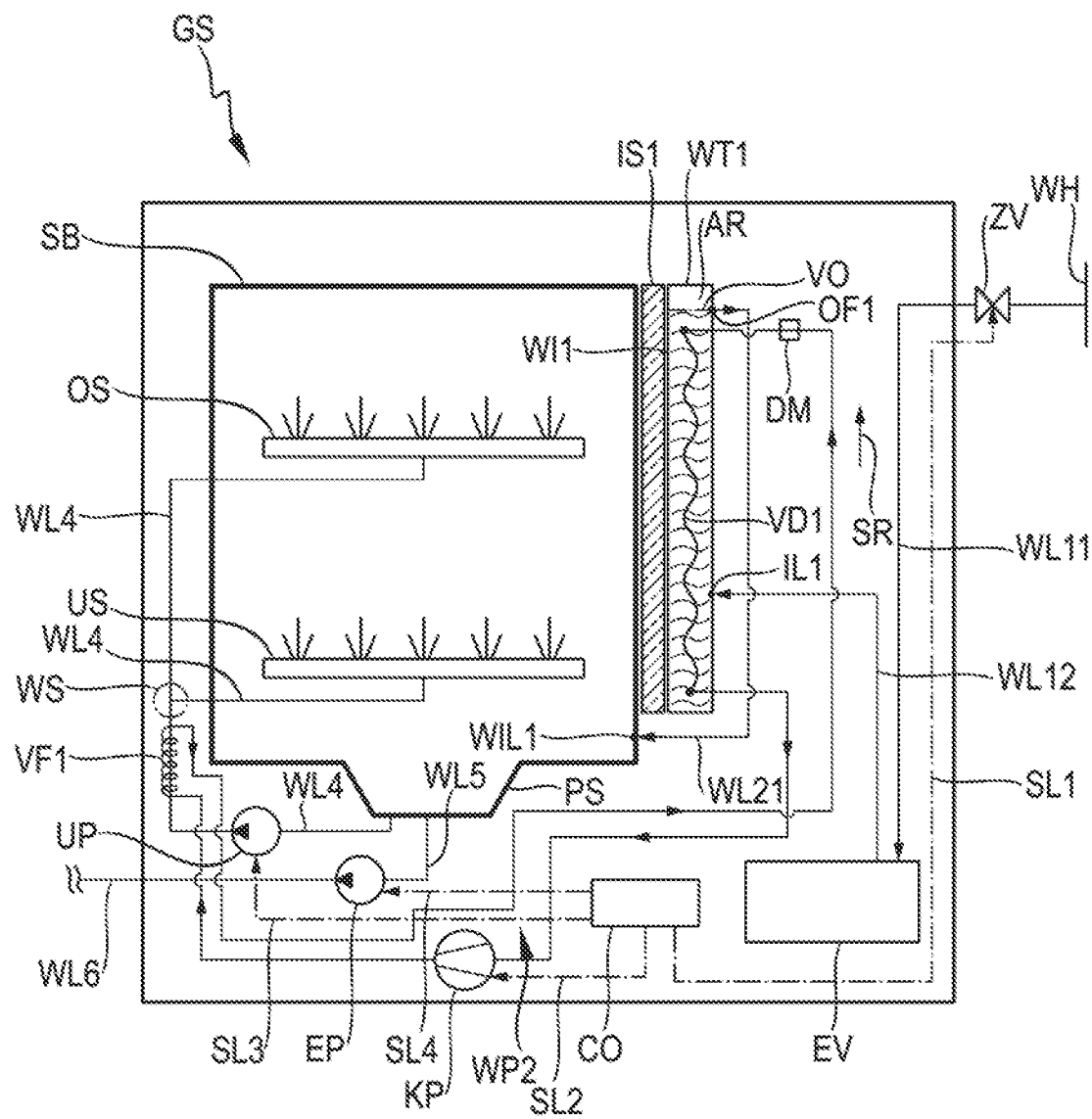
FIGS. 6-9 show further advantageous modifications of the dishwasher in FIG. 1.

FIG. 6 shows a further advantageous variant of an inventively configured dishwasher. In contrast to FIG. 1 the condenser VF1 of the heat pump WP1 is now housed in the outlet tube or pressure tube WL4 of the circulating pump UP (when viewed in the flow direction of the pumped or circulated water). It is preferably inserted into a connecting tube between the circulating pump UP and the water switch WS. In some instances it is also possible to house the condenser VF1 in the circulating pump UP itself and thus configured this latter as a heat pump.

Figure 7:
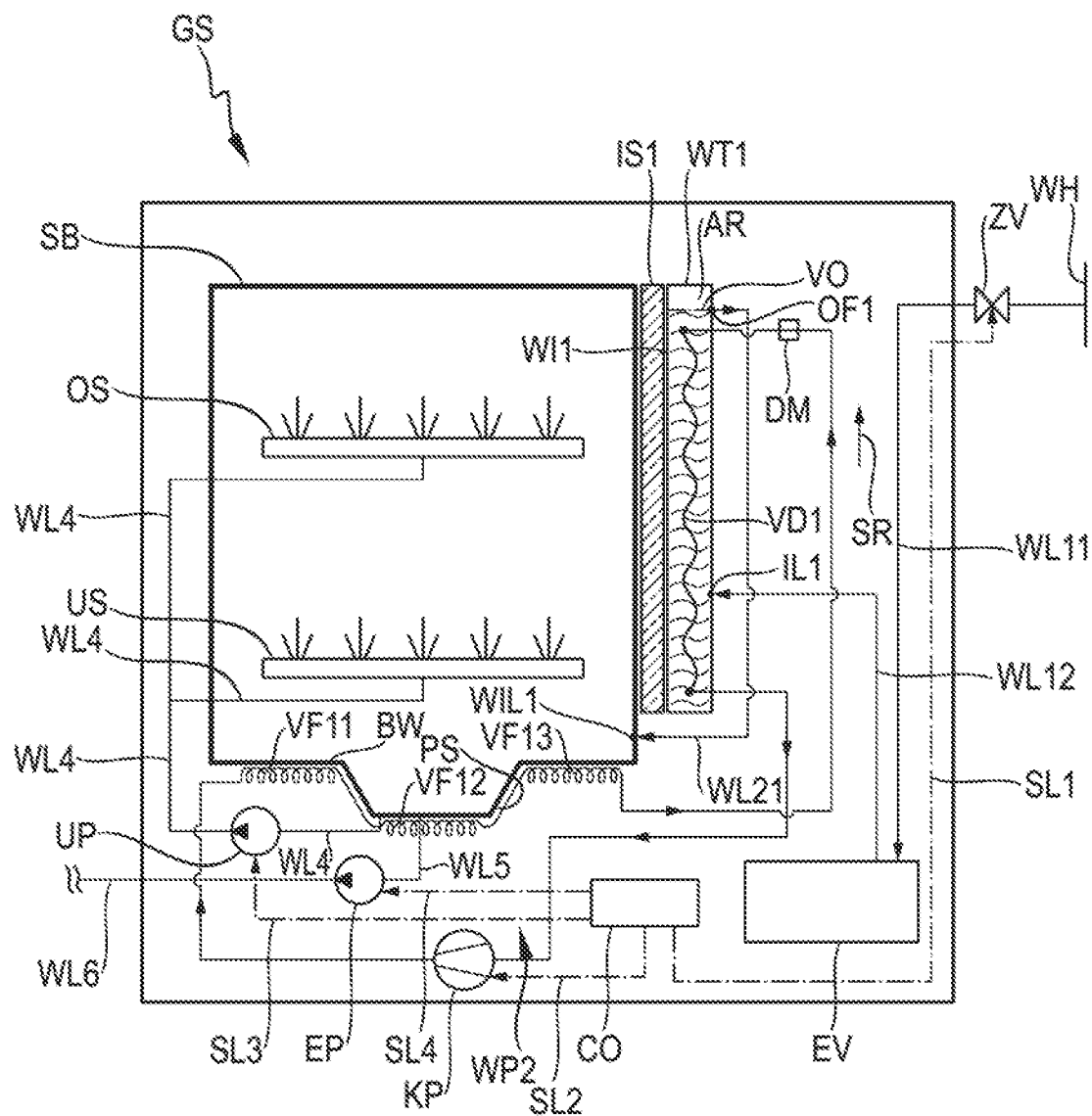

In an advantageous variant of FIG. 1 in the exemplary embodiment in FIG. 7 one or more condenser segments, for example VF11, VF12, VF13, of the heat pump WP1 are attached in a heat-conducting manner to the lower face of the bottom BW of the wash container. This variant is advantageous when the heat pump WP1 is operated actively during the drying cycle, as the air in the wash container can then also be heated by the condenser.

Figure 8:
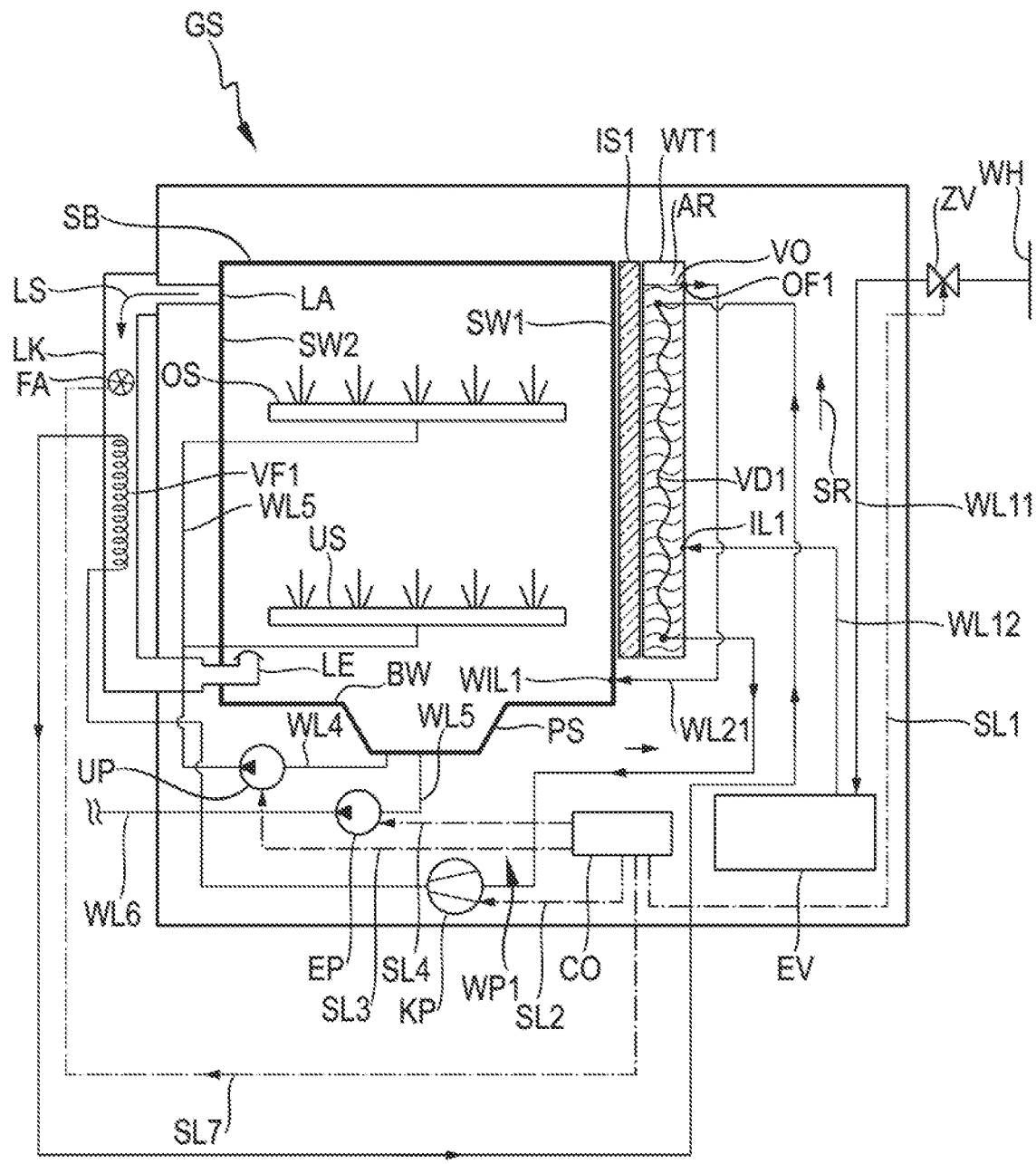

FIG. 8 shows a further advantageous variant of the dishwasher in FIG. 1. The condenser VF1 of the heat pump WP1 is now housed in a specifically provided air duct LK. The air duct LK connects an air outlet LA of the wash container to an air inlet LE of the wash container. It is arranged outside the wash container SB and extends predominantly on the second side wall SW2 of the wash container opposite the fill reservoir WT1. The air outlet LA can advantageously be provided in the central or even better the upper region of the side wall SW2. The air inlet LE is provided for example in the region of the bottom BW of the wash container SB. A blower or fan FA is housed in the air duct LK. It is used to generate a forced air flow LS from the air outlet LA in the direction of the air inlet LE. The condenser VF1 is preferably arranged after the blower FA in the air duct LK when viewed in the air flow direction LS. In the phase, for example RG or KG, of a wash cycle during which the quantity of wash liquid introduced into the wash container in each instance is to be heated by means of the condenser VF1 during operation of the heat pump WP1, the blower FA is activated by the monitoring facility CO by way of a control line SL7. The resulting air flowing past the condenser VF1, which is taken in by the blower from the interior space of the wash container by way of the air outlet LA and then blown back into the wash container by way of the air inlet LE after flowing past the condenser VF1, can also heat the air in the interior space of the wash container and therefore also the quantity of wash liquid present therein efficiently. This variant is advantageous when the heat pump WP1 is operated actively during the drying cycle, as the air in the wash container can then also be heated by the condenser.

Figure 9:
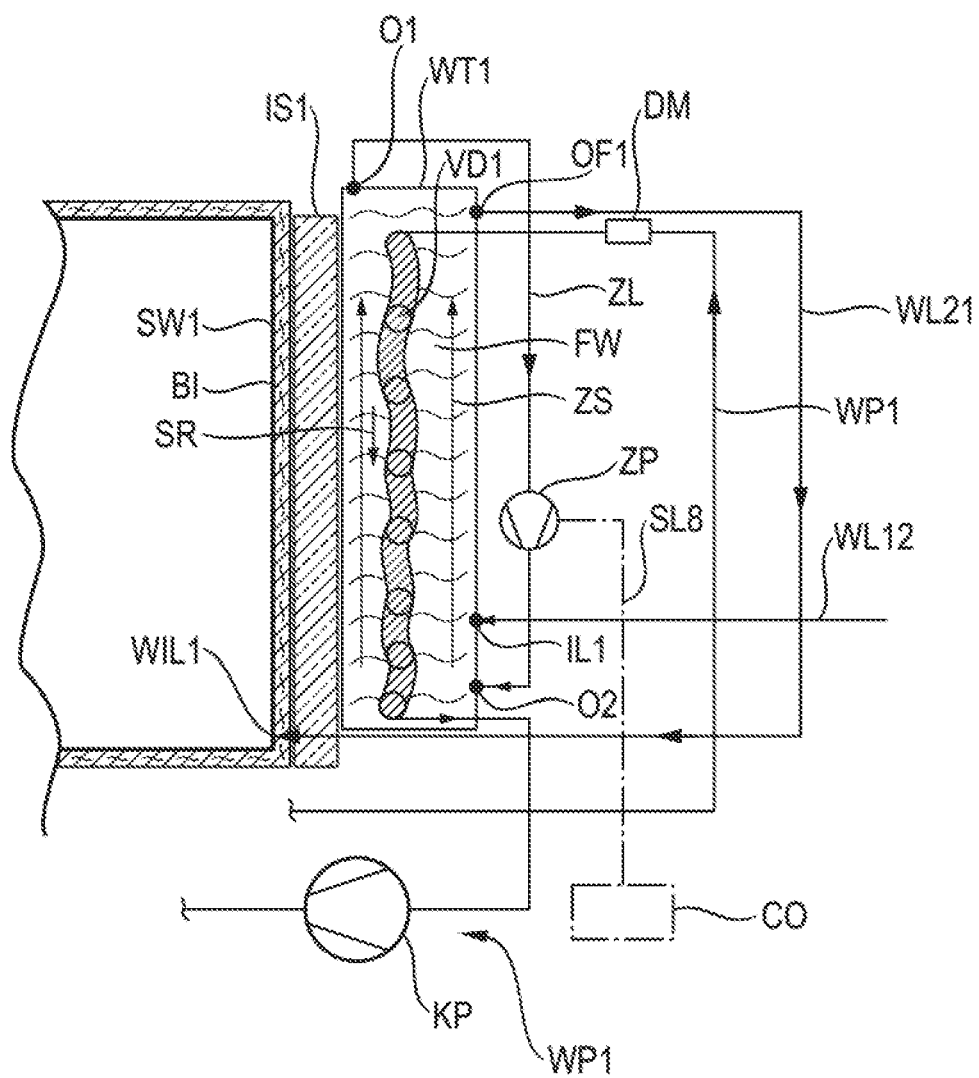

For the most efficient extraction possible of heat from the stored water of the respective fill reservoir, for example WT1, it can be particularly advantageous during operation of the heat pump, for example WP1, for the flow of coolant generated by its compressor, for example KP, to have a direction component counter to a direction component of the natural or forced convection flow, for example ZS, of the stored water, for example FW, in the fill reservoir, for example WT1. In FIG. 9 a forced flow ZS is applied to the stored water FW in the fill reservoir WT1 by a pump or rotatingly driven impeller ZP. Other water movement means, in particular flow generation means, are of course also possible. The circulation pump ZP can be controlled and/or regulated by the monitoring facility CO by way of a control line SL8 (shown as a dot/dash line in FIG. 9). Water is sucked or pumped out of the fill reservoir through a first opening O1 by way of a circulation line ZL preferably at the upper end of the fill reservoir WT1 and pumped back into it through a second opening O2 in the fill reservoir at the lower end of the fill reservoir WT1. The two openings O1, O2 here are particularly located obliquely, in particular roughly diagonally, opposite one another (see FIG. 11). This produces a water flow ZS in the fill reservoir with a flow component in the vertical direction from bottom to top. If the evaporator VD1 for example predominantly only has line segments in the vertical direction, in which the coolant flows in the gravity direction, in other words from top to bottom, the flow direction SR of the coolant in the evaporator VD1 runs counter to the vertical direction component of the water flow ZS forced from bottom to top in the fill reservoir by means of the pump ZP. This brings about a highly efficient transfer of heat from the stored water FW to the coolant in the evaporator VD1. A tubular plate evaporator with vertical tubing, as shown by way of example in the schematic front view in FIG. 9, is suitable in particular for such an exchange of heat, generally referred to as a "counterflow principle heat exchange". With this the vertical line segments are connected at their ends by a transverse line segment that is much shorter than them.

It can be expedient in particular to provide the fresh water inlet IL1 in the wall of the fill reservoir WT1 where ice formation starts latest on the evaporator VD1 during heat pump operation. The inlet IL1 is therefore as far away as possible from the segment of the evaporator VD1 which the coolant of the heat pump WP1 enters (when viewed in the flow direction SR of the coolant in the circuit of the heat pump). A corresponding arrangement can also be expedient for the outlet OF1 of the fill reservoir. This largely prevents unwanted clogging or blocking of the fresh water inlet IL1 and/or outlet OF1 with ice, so fresh water FW* can still flow into the fill reservoir and/or out of this into the discharge line WL21 leading to the wash container after the respective heat pump operation. In the exemplary embodiment in FIG. 9 the fresh water inlet IL1 is provided in the lower region of the fill reservoir WT1. During heat pump operation the water freezes from the top, as the coolant is sprayed into the evaporator VD1 from above by the pressure reduction means DM, in particular expansion valve or small capillary tube and the evaporator VD1 is coldest there. The flow of warmer stored water and/or fresh water to this upper segment of the evaporator VD1 from below can delay ice formation on the upper segment of the evaporator. Therefore, as in the exemplary embodiment in FIG. 9 here, the outlet OF1 can remain arranged in the upper region of the fill reservoir. This ensures more regular cooling of the overall quantity of stored water in the fill reservoir due to water movement in the fill reservoir. This results in better utilization by the heat pump of the thermal heat contained in the stored water, thereby improving its COP.

In particular it may be expedient additionally or independently for the water inlet IL1 of the fill reservoir WT1 to be provided in the lower region, in particular on the base of the fill reservoir, but for the water outlet OF1 to be provided in the upper region of the fill reservoir, in particular with an oblique, preferably diagonal, offset to the water inlet IL1. The flow of incoming fresh water FW* at inflow temperature TWT* from below to this upper segment of the evaporator VD1 means that ice formation on the upper segment of the evaporator VD1 where the coolant of the line circuit of the heat pump first arrives, can be delayed and/or the water inlet IL1 can be kept ice-free for longer. This increases the efficiency of the heat pump WP1.

Generally speaking the sensible and latent heat contained in the stored water FW in the fill reservoir WT1 can be extracted more efficiently by the evaporator when the stored water FW in the fill reservoir WT1 is forced to move, in particular in proximity to the evaporator coils. Various flow generation means can be provided for this purpose. These can be for example a rotatingly drivable impeller in the fill reservoir or quite simply inflowing fresh water FW*. Natural convection can also generate a corresponding water flow in the fill reservoir. If fresh water FW* is introduced into the fill reservoir by means of the feed valve ZV, the water flow has a diagonal direction from a lower corner region of the fill reservoir, in which the inlet IL1 is provided in the wall of the fill reservoir, to an upper corner region obliquely opposite, in which the outlet OF1 is provided in the wall of the fill reservoir. Topping up with fresh water FW* therefore also delays premature ice formation on the evaporator VD1. This is shown in FIG. 11 in a side view of the fill reservoir WT1. Here, in contrast to FIG. 9, the evaporator VD1 is embodied as a tubular plate evaporator with predominantly horizontal tubing. The circulation circuit ZL with the circulating pump ZP allows the stored water FW to be forced as required to flow in a roughly diagonal flow direction ZS, for example from the left lower inlet O2 to the right upper outlet O1. In addition to or independently thereof (rotated through 90° counterclockwise thereto) the fresh water FW* can flow into the fill reservoir through the inlet opening IL1 in the right lower corner when the inlet valve ZV is opened and stored water can leave the fill reservoir through the outlet opening OF1 in the left upper corner, also thereby generating a water flow in a diagonal direction KR. Both the water flow ZS and the water flow KR have a direction component, which is counter to the flow direction SR of the coolant in the horizontal evaporator segments. This counterflow principle improves the efficiency of the evaporator and therefore the COP of the heat pump. A forced flow in the full reservoir is preferably generated when there is free convection in the fill reservoir, for example due to the density anomaly of water at around 4° C.

In general terms it is particular advantageous for the fresh water inlet, for example ILL of the fill reservoir, for example WT1, (and/or also its water outlet, for example OF1) to be provided at a location in its container wall, which is as far away as possible from the entry point of the coolant into the evaporator, for example VD1. This allows the fresh water inlet (and/or water outlet) to remain largely ice-free during operation of the heat pump, for example WP1. It is therefore also possible to feed fresh water into the fill reservoir, for example for a subsequent wash sub-cycle, after the end of heat pump operation without the longer wait that would otherwise be required to thaw an ice mass blocking the inlet. Also fresh water FW* can flow to the evaporator, for example VD1, from the inlet opening IL1 that has remained ice-free, said fresh water FW* having a higher inflow temperature TWT* than the temperature of the evaporator. Thus when fresh water TWT* is fed into the fill reservoir, for example WT1, through the inlet, for example ILL once or a number of times, the stored water in the region around the evaporator can be thawed or premature icing can be avoided there. The overall quantity of stored water in the fill reservoir can thus be cooled more homogeneously by the evaporator, thereby improving the COP of the heat pump.

It can be expedient in particular for at least one detection means DV (see FIG. 1), for example a temperature sensor, to be provided to detect at least one parameter, for example the temperature TWT, which characterizes the respective heat energy content of the fill reservoir WT1. The monitoring facility CO can then use this parameter to monitor, in particular control and/or regulate, the work sequence, in particular the activation and/or deactivation states, of the heat pump WP1, and/or another component of the fill reservoir WT1, for example the circulation pump ZP in the circulation circuit ZV of the fill reservoir WT1, the fresh water feed apparatus ZLV and/or the discharge apparatus ALV.

To increase the stored thermal heat of the fill reservoir it can in some instances be expedient for a sub-segment of the waste water line WL6, by way of which the drain pump EP pumps used wash water out of the wash container and discharges it to a household waste water pipe (not shown in FIG. 1) to be passed through the fill reservoir WT1 or brought into thermal contact therewith in some other manner. This allows the residual heat contained in the discharged, used wash water to be transferred to the stored water FW in the fill reservoir WT1, thereby thermally replenishing it. This also improves the electrical energy footprint of the dishwasher. This variant is omitted from FIG. 1 for the sake of the clarity of the drawing.

It can in some instances be favorable if at least one PCM element or part PE is housed in the interior of the fill volume of the fill reservoir WT1, its phase change temperature expediently being selected to be higher than that of water and lower than the ambient temperature, in particular between 3° C. and 10° C. In FIG. 1 such a PCM element PE is shown with a dot/dash line in the fill reservoir WT1. It is positioned on the inside of the wall WI of the fill reservoir WT1 facing the wash container SB. When the fill reservoir is filled full of water, the PCM element is preferably surrounded all round by said water. This particularly favorably increases the heat storage capacity of the fill reservoir. Paraffins in particular can be selected as the PCM material. It is expediently enclosed in a leakproof sleeve all round so that it cannot escape if its phase change temperature is exceeded, in other words in the liquid state.

It may in particular be sufficient for the fill reservoir WT1 only to have at least one thermal insulation coating or layer, in particular made of PCM, on the outside and/or inside of its wall WI1 facing the wash container SB. Thermal insulation, in particular PCM material, can be omitted on its other walls. This saves insulation material and can be favorable in respect of design and assembly. An inventive insulation system with poor thermal coupling is therefore provided in a simple manner between the interior space of the wash container and the interior space of the fill reservoir. There is then no need for the separate heat insulation element IS1.

It may be advantageous in some instances for the fill reservoir itself to be provided with a full PCM sleeve, in other words to be provided all round on its inner wall and/or outer wall with an insulation material in the form of PCM (phase change material), its phase change temperature being selected to be higher than that of the fresh water stored in an intermediate manner in the fill reservoir during heat pump operation, in particular between 3° C. and 10° C. Its phase change temperature is preferably selected to be lower than the temperature in the wash container at the end of the respective heating time segment of the respective wash sub-cycle with wash liquid to be heated, for example the cleaning cycle or final rinse cycle, preferably lower than ambient temperature, so that lost heat from the wash container can be stored in it as latent heat, in particular also ambient heat. Standard PCM materials have relatively poor heat-conducting properties, in other words they act in a heat-insulating manner. This allows the fill reservoir to be thermally insulated on the inside and/or outside by PCM attached to the inner wall and/or outer wall. Because the phase change of the PCM takes place at a higher temperature level than the phase change of water, the emission of latent heat means that the temperature of the wall of the fill reservoir on the outside of the fill reservoir facing away from the wash container remains approximately constant at the melting temperature of the phase change material during the time period in which the heat pump is operating and causes the fresh water in the fill reservoir to become icy water and/or solid ice. When the heat pump is deactivated, the PCM absorbs lost heat from the wash container and/or heat from the environment and melts, as a result of which it is at least at a melting temperature that is higher than that of the water in the fill reservoir. There is generally a temperature of 15° C. to 24° C. in a kitchen, so the PCM has expediently has a melting temperature that is higher than that of icy water/solid ice and lower than ambient temperature. This reduction in the temperature gradient between the temperature of the ambient air and the temperature of the outer wall of the fill reservoir facing away from the wash container compared with when the outer wall of the fill reservoir facing away from the wash container has no PCM material, means that less water from the ambient air can condense on the outside of the fill reservoir facing away from the wash container. This largely prevents contamination of or damage to the floor and/or adjoining kitchen furniture elements at the site of the dishwasher. When the fresh water in the fill reservoir has been cooled significantly, in particular to less than 4° C., preferably below 0° C., after the end of the last heat pump operation, as for example during the final rinse cycle, and become icy water/solid ice, the PCM which has also cooled to below its phase change temperature and hardened then delays the heating of the cold water or icy water/solid ice in the fill reservoir due to the lost heat escaping from the wash container compared with a fill reservoir without PCM during the drying cycle that completes the wash cycle.

It may in some instances also be favorable for a PCM material to be used for the heat insulation element IS1 (see for example the exemplary embodiment in FIG. 1) between the wash container SB and the fill reservoir WT1 attached to the outside, in other words generally speaking at least one coating or layer of PCM is inserted between the wall of the fill reservoir facing the wash container and the wall of the wash container facing the fill reservoir in this advantageous variant. The melting temperature of the PCM is advantageously selected to be higher than that of water and lower than the temperature in the wash container at the end of the heating time period of the respective wash sub-cycle with wash liquid to be heated. In particular the phase change temperature of the PCM is selected to be lower than ambient temperature, in order also to be able to collect ambient heat. As set out above, this is favorable for the drying cycle, as the wall of the wash container, to which the fill reservoir is attached, can be kept sufficiently cool for longer for moisture from the moist warm air in the wash container to condense on it in the desired manner during the drying cycle. There is then no need in some instances for separate thermal insulation, in particular a PCM sheath, for the fill reservoir (as in the preceding exemplary embodiment).

One particular advantage of the inventively configured dishwasher with the fill reservoir attached to the outside of the wash container and serving both as a filling means for filling the wash container with a quantity of wash liquid required for the respective water-conducting wash sub-cycle and at the same time as a heat source for the heat pump is, generally speaking, that the external temperature of the fill reservoir WT1 is constantly, in other words during all the wash sub-cycles VG, RG, ZG, LG and the final drying cycle TG of the wash cycle, below the ambient temperature UT. This ensures that a heat flow takes place on the wall, e.g. SW1, of the wash container to which the fill reservoir, for example WT1, is attached, from the warmer wash container into the relatively cooler fill reservoir and a transfer of heat from the interior space of the wash container to the environment is largely prevented. It is also advantageous that thermal energy can also be drawn in particular from the environment into the relatively cooler fill reservoir and can thus be used to partially heat the fill reservoir WT1.

The fill reservoir, for example WT1, is advantageously configured as an open storage unit, in other words during the respective wash cycle SG, in particular for each water-conducting wash sub-cycle, stored fresh water FW is taken from it at least once by way of the discharge apparatus, for example ALV, and new fresh water, for example FW*, is fed to it at least once by way of the feed apparatus, for example ZLV. This partial or complete exchange or change of water largely prevents contamination of the fill reservoir with micro-organisms, which is otherwise possible with a closed heat storage tank filled full once with water. Also the risk of unpleasant odors is not critical with an open storage unit. Also the partial or complete exchange or change of water advantageously allows efficient thermal regeneration of the fill reservoir. The single or multiple taking and feeding in of fresh water per wash cycle, preferably at least one taking and at least one feeding in operation per water-conducting wash sub-cycle, in particular at the end of the respective water-conducting wash sub-cycle or in the transition phase from one water-conducting wash sub-cycle to the next wash sub-cycle of a wash cycle, also generates a flow dynamic or water movement in the fill reservoir, in other words forces convection, resulting in a mixing of the quantity of new fresh water flowing in out of the feed apparatus and the quantity of water already present in the fill reservoir. A mixed temperature is therefore established for this water mix in the fill reservoir, this being between the inflow temperature TWT* of the new fresh water FW* flowing in and the current temperature TWT of the water FW present in the fill reservoir. If the heat pump is operated for a desired heating time period of a wash sub-cycle and as a result heat energy is extracted from the quantity of water contained in the fill reservoir by means of the evaporator, the quantity of water in the fill reservoir is cooled and ice is generated in particular to utilize the latent heat energy stored in the water. If in a further variant fresh water is now introduced into the fill reservoir by means of the feed apparatus at least once during the time period of heat extraction by means of the evaporator, the freezing of the quantity of water present in the fill reservoir can be delayed or, if icy water/ice has already formed, it can be thawed, in other words regenerated. The feeding in of fresh water therefore allows the fill reservoir to be topped up or replenished with thermal energy. To this end the fill reservoir expediently provides a corresponding top-up volume. For the extraction of a specified desired quantity of thermal heat energy by the heat pump the storage volume of the open fill reservoir for water can be smaller due to the feeding in of fresh water than would be the case with a closed water tank. Also the water taken out of the fill reservoir in each instance is used as wash liquid in the wash container for the respective water-conducting wash sub-cycle of a wash cycle to be performed so that strict requirements for a maximum permissible water consumption per wash cycle can be met.

To summarize a fill reservoir or heat exchanger is attached to one or more side walls of the wash container of a dishwasher and filled with fresh water. A thermal insulation layer is present between the fill reservoir and the container wall, allowing a small heat flow between the wash container and the fill reservoir. The water in the fill reservoir is introduced, in particular released, into the wash container for use as wash liquid during one or more wash sub-cycles of a wash cycle. The evaporator of a heat pump is attached to or in the fill reservoir, said heat pump pumping the heat energy from the stored water in the fill reservoir into the wash container, in particular its wash liquid circulating circuit. To this end the condenser of the heat pump is advantageously integrated in the water circuit of the wash liquor circulation system of the dishwasher. Alternatively the condenser of the heat pump can be attached to the bottom of the wash container. The condenser can be used to improve drying, in other words the heat pump can also continue to be operated during the drying cycle of a wash cycle. When the heat pump is activated during the drying cycle, the air in the wash container is expediently heated and dried by means of a condenser correspondingly thermally coupled to the interior space of the wash container. To this end it can be advantageous for the condenser to be integrated in an air circuit, which is connected to the interior space of the wash container. This arrangement can also be used in the drying phase to improve drying.

Electrical energy can be saved in each wash cycle in that the fill reservoir, which is provided to fill the wash container with inlet-side fresh water, also serves as a heat source for a heat pump. The fill reservoir here is advantageously configured as an open container, to which fresh water is fed at least once per wash cycle, in particular per water-conducting wash sub-cycle, and from which water is taken at least once to fill the wash container. In simple terms the fill reservoir is thus integrated in the wash cycle of an ongoing dishwashing program, preferably by taking water to fill the wash container with desired quantities of water for the water-conducting wash sub-cycles of a wash cycle and by associated topping up with fresh water. The dynamic exchange of water in the fill reservoir associated herewith during a wash cycle reduces the risk of contamination of the fill reservoir. It is also possible to absorb and store the thermal lost heat or radiated energy from the wash container in the fill reservoir, in particular during the subsequent wash phase of the cleaning cycle.

Additional potential for improvement can be made possible by the following advantageous variants:

The insulation between the fill reservoir and the wash container wall assigned thereto is embodied as switchable heat insulation, in other words the condensation heat is dissipated efficiently when the insulation is switched to conduct in the drying phase.

A PCM (for example with a melting temperature of around 3° C.) can also be provided in or on the fill reservoir, its melting temperature being higher than that of water to increase the stored energy in the fill reservoir. This can in some instances avoid the water in the fill reservoir having to be frozen in order to be able to extract a required quantity of sensible and latent heat from the fill reservoir. The fill reservoir can preferably be filled constantly with water, in other words water flowing out is replaced immediately with water flowing in. An improvement in the COP value of the heat pump can thus be anticipated, as the temperature deltas between condenser and evaporator are smaller than when a closed water tank is used as the heat storage unit.

Because a larger portion of the heating energy is for the benefit of the heat pump in the heating phases of a wash cycle, the energy advantage is greater than for a dishwasher with a conventional water heater. The input of the additional heater (in particular heat pump) for the thermal quantity of heat to be supplied as whole for each heating phase can be reduced. In some instances there may be no need for an additional heater and the heat pump alone can serve to heat the wash liquid in the wash container.

In the drying phase the heat pump can also be used for drying. The condenser, which is for example attached to the bottom of the container, heats the interior space, thereby assisting the evaporation process for liquid, in particular on the dishes, in the wash container. The cold side walls of the wash container, which have been cooled by the evaporator, assist the condensation process here.

A wash liquor storage unit, in which the warm water, for example the final rinse liquor, is stored after the end of the final rinse cycle, can also be used as an energy storage unit for the heat pump when the heat pump is used in the drying phase.

A number of walls of the wash container can have the fill reservoir attached, the evaporator of the heat pump being coupled thermally thereto. This ensures a higher energy potential and drying is improved by additional condensation surfaces. The energy loss to the environment due to convective heat transfer and heat radiation becomes negative, as the temperature of the walls is below ambient temperature.

The waste water hose of the dishwasher can advantageously be passed through the fill reservoir. As a result the stored water in the fill reservoir is also heated by waste water, which is pumped out of the wash container by the drain pump and is still warm.

Advantages are in particular:
Heat losses from the wash container to the outside are stored in the fill reservoir and are pumped back into the wash container by the heat pump.
The stored water in the fill reservoir can also be heated by heat from the environment.
An open fill reservoir is present as the energy storage unit, as the water from the fill reservoir is not only used as the heat source for the heat pump but is integrated in the wash water circuit during a wash cycle.
Water changes take place in the fill reservoir for each wash cycle, thereby significantly reducing or even completely preventing the risk of contamination (compared with a closed system).
The arrangement of the fill reservoir on the side wall and not on the bottom space of the wash container reduces the space requirement for the base components of the dishwasher.
Energy reduction due to deployment of the heat pump.

The invention claimed is:

1. A household dishwasher for washing dishes in at least one water-conducting wash sub-cycle and for subsequently drying the dishes in at least one subsequent drying cycle of a wash cycle to be performed, said household dishwasher comprising:

a wash container for holding the dishes to be washed, a fill reservoir attached to an outside of the wash container, said fill reservoir having an inlet connected to an inlet-side fresh water feed apparatus for filling with fresh water from a fresh water network, and an upper outlet connected to an outlet-side fresh water discharge apparatus for removing a quantity of fresh water required for the wash sub-cycle from the fill reservoir and feeding it into the wash container, wherein the fill reservoir is configured as an open, overflow storage unit, such that on condition that fresh water is fed to the fill reservoir via the inlet, a water level of a mixed water, formed from a quantity of water already present in the fill reservoir nod a newly fed-in quantity of the fresh water, rises above a lower edge or the upper outlet so that water flows automatically from the upper outlet by way of the outlet side fresh water discharge apparatus into the wash container as the quantity of fresh water required for the wash sub-cycle, at least one heat pump comprising an evaporator thermally coupled to the fill reservoir to extract heat energy from stored fresh water, and a condenser configured to feed heat energy into an interior space of the wash container, and a single-layer or multilayer insulation material system disposed between the interior space of the wash container and an interior space of the fill reservoir to reduce a heat flow from the wash container.

2. The household dishwasher of claim 1, wherein the fill reservoir is firmly attached to an outside of a side wall of the wash container in surface contact therewith.

3. The household dishwasher of claim 2, wherein the thermal insulation material system comprises a heat insulation element configured as a solid unit.

4. The household dishwasher of claim 3, wherein the heat insulation element is flat.

5. The household dishwasher of claim 3, wherein the solid unit is an insulating fleece or a foam material.

6. The household dishwasher of claim 3, wherein the heat insulation element rests on an outside of an outer wall of the wash container, said fill reservoir being placed upon the heat insulation element with surface contact.

7. The household dishwasher of claim 6, wherein the fill reservoir covers at least 50%, in particular between 70% and 100%, of an entire surface of the outside of the outer wall.

8. The household dishwasher of claim 3, further comprising a coating layer applied to an outer wall of the wash container, said heat insulation element resting on an outside of the coating layer, said fill reservoir placed upon the heat insulation element with surface contact.

9. The household dishwasher of claim 8, wherein the coating layer is a bitumen layer.

10. The household dishwasher of claim 1, further comprising a plurality of said fill reservoir disposed on an outside of side walls of the wash container, respectively, in particular two opposing ones of the side walls.

11. The household dishwasher of claim 1, wherein the fill reservoir has a wall side facing the wash container and thermally insulated to a greater extent than a wall side facing away from the wash container and facing the environment in particular.

12. The household dishwasher of claim 1, wherein the thermal insulation material system as a whole has a thermal resistance of at least 0.02 (K m$^2$)/W, in particular between 0.1 (K m$^2$)/W and 1 (K m$^2$)/W.

13. The household dishwasher of claim 1, wherein the fill reservoir is provided on an inside and/or outside with PCM material defined by a phase change temperature which is higher than a phase change temperature of fresh water temporarily stored in an intermediate manner in the fill reservoir, said phase change temperature of the PCM material ranging between 3° C. and 10° C. in particular.

14. The household dishwasher of claim 1, wherein the heat pump is configured to heat a treatment quantity of water in the wash container at an end of a heating time segment of the wash sub-cycle performed by the heat pump to a required minimum temperature via the condenser of the heat pump, and to cool the fresh water in the fill reservoir via the evaporator of the heat pump to a temperature in a range between −4° C. and +10° C., in particular to freeze between 10% and 90% of a maximum fill volume of water, in particular fresh water, in the fill reservoir.

15. The household dishwasher of claim 14, further comprising a monitoring facility to operate the heat pump.

16. The household dishwasher of claim 1, wherein the fill reservoir is connected to the wash container in a thermally active manner and/or the heat pump is configured and/or operated in particular by a monitoring facility such that the temperature of fresh water in the fill reservoir during a time period after the end of a heating time segment of a preceding wash sub-cycle, in which a quantity of water in the wash container has been heated via the condenser of the heat pump, until a start of a subsequent wash sub-cycle, in particular a start of a subsequent wash sub-cycle, in which the heat pump is brought into operation again, is lower than a temperature in the wash container, and in particular is lower than an ambient temperature at a site of the household dishwasher predominantly during this time period.

17. The household dishwasher of claim 1, wherein the fill reservoir is connected to the wash container in a thermally active manner and/or the heat pump is configured and/or operated in particular by a monitoring facility such that ice/icy water that has formed in the fill reservoir due to extraction of heat by the evaporator during a heating time segment of a preceding wash sub-cycle, in which a quantity of water in the wash container has been heated by the condenser of the heat pump, has thawed by at least 25%, in particular between 40% and 100%, preferably 100%, of its ice volume at an end of the heating time segment of the preceding wash sub-cycle by a start of a subsequent wash sub-cycle, in particular by a start of a subsequent wash sub-cycle, in which the heat pump has been brought into operation again, essentially by a transfer of heat from the wash container into the fill reservoir and/or by a transfer of heat from the environment of the household dishwasher to the fill reservoir, wherein thawed water in the fill reservoir at the start of the subsequent wash sub-cycle has a temperature above a freezing point of water, preferably between 15° C. and 30° C.

18. The household dishwasher of claim 1, wherein at least one member selected from the group consisting of the fill reservoir, the inlet-side fresh water feed apparatus for feeding fresh water into the fill reservoir, and the outlet-side fresh water discharge apparatus for removal of fresh water from the fill reservoir is configured and/or adjustable in particular via a monitoring facility such that feeding of fresh water into the fill reservoir is coupled to, in particular correlated with, in particular in respect of time and/or quantity, the removal of fresh water from the fill reservoir for the water-conducting wash sub-cycle.

19. The household dishwasher of claim 1, wherein at least one member selected from the group consisting of the fill reservoir, the inlet-side fresh water feed apparatus for feeding fresh water into the fill reservoir, and the outlet-side fresh water discharge apparatus for a removal of fresh water from the fill reservoir is configured and/or adjustable in particular via a monitoring facility such that essentially a same quantity of fresh water that is removed from the fill reservoir for the water-conducting wash sub-cycle and discharged into the wash container by way of the fresh water discharge apparatus is fed again to the fill reservoir by the fresh water feed apparatus with a substantially complete time overlap with the removal of fresh water from the fill reservoir.

20. The household dishwasher of claim 1, wherein at least one member selected from the group consisting of the fill reservoir, the inlet-side fresh water feed apparatus for feeding fresh water into the fill reservoir, and the outlet-side fresh water discharge apparatus for removal of fresh water from the fill reservoir is configured and/or adjustable in particular via a monitoring facility such that during the wash sub-cycle and, optionally, also during the drying cycle to complete the wash cycle, in particular over at least one filling and/or discharge sequence of an overall wash cycle, the fill reservoir is filled at all times with fresh water approximately to a same target level, in particular a maximum target level, which is assigned to a maximum liquid fill volume of the fill reservoir.

21. The household dishwasher of claim 1, wherein the inlet-side fresh water feed apparatus for feeding fresh water into the fill reservoir is configured and/or adjustable in particular via a monitoring facility such that after a heating phase of the wash sub-cycle, in which a quantity of water in the wash container has been heated via the condenser of the heat pump and in which a quantity of fresh water in the fill reservoir has been cooled to a cold water temperature lower than an inflow temperature of the fresh water, in particular to less than 8° C., preferably being partially or completely frozen to form ice, with the aid of the evaporator of the heat pump, fresh water with an inflow temperature that is higher than a cold water temperature is again introduced into the fill reservoir to regenerate the cold water or ice.

22. The household dishwasher of claim 1, further comprising a detector configured to detect at least one parameter characterizing a heat energy content of the fill reservoir, and a monitoring facility configured to monitor, in particular control and/or regulate, in response to the parameter a work sequence, in particular an activation and/or deactivation states, of the heat pump, and/or another component of the fill reservoir, the fresh water feed apparatus and/or the discharge apparatus.

23. The household dishwasher of claim 1, further comprising a water movement member, in particular a flow generator configured to force water movement, in particular water flow, preferably circulating flow, in the fill reservoir, in particular during operation of the heat pump.

24. The household dishwasher of claim 1, wherein only the heat pump is provided to heat wash liquid in the wash container during a predetermined heating time segment of the cleaning cycle and during a predetermined heating time segment of a final rinse cycle of the wash cycle.

25. The household dishwasher of claim 1, further comprising an electric heater and a monitoring facility, said monitoring facility configured to operate the electric heater parallel to the heat pump so as to heat wash liquid and/or air in the wash container to a required minimum temperature, or to operate the electric heater only after a heating time period of the heat pump following a deactivation of the heat pump to reheat wash liquid and/or air in the wash container to a required minimum temperature.

26. The household dishwasher of claim 1, wherein the heat pump is operated during the drying cycle that completes the wash cycle.

27. The household dishwasher of claim 1, wherein the inlet of the fill reservoir comprises a lower inlet opening disposed closer to a bottom of the fill reservoir, and wherein fresh water is fed to the fill reservoir through the lower inlet opening.

28. A method for washing dishes in a wash container of a household dishwasher in at least one water-conducting wash sub-cycle and for drying the dishes in a subsequent drying cycle of the wash cycle, said method comprising:
removing a quantity of water required for the wash sub-cycle in the wash container from a fill reservoir disposed on an outside of the wash container and filled with fresh water from a fresh water network, wherein the fill reservoir is configured as an open, overflow storage unit having an inlet and an upper outlet, such that on condition that fresh water is fed to the fill reservoir via the inlet, a water level of a mixed water, formed from a quantity of water already present in the fill reservoir nod a newly fed-in quantity of the fresh water, rises above a lower edge or the upper outlet so that water flows automatically from the upper outlet by way of an outlet-side fresh water discharge apparatus into the wash container as the quantity of fresh water required for the wash sub-cycle,
feeding the quantity of water required for the wash sub-cycle into the wash container,
heating the quantity of water required for the wash sub-cycle to a minimum temperature in an interior space of the wash container by extracting heat energy from fresh water in the fill reservoir via an evaporator of a heat pump and feeding the heat energy into the interior space of the wash container via a condenser of the heat pump, and
placing a single-layer or multilayer insulation material system between the interior space of the wash container and an interior space of the fill reservoir to reduce a heat flow from the wash container.

29. A household dishwasher for washing dishes in at least one water-conducting wash sub-cycle and for subsequently drying the dishes in at least one subsequent drying cycle of a wash cycle to be performed, said household dishwasher comprising:
a wash container for holding the dishes to be washed,
a fill reservoir attached to an outside of the wash container, said fill reservoir having a lower inlet disposed closer to a bottom of the fill reservoir and connected to an inlet-side fresh water feed apparatus for filling with fresh water from a fresh water network, and an upper outlet connected to an outlet-side fresh water discharge apparatus for removing a quantity of fresh water required for the wash sub-cycle from the fill reservoir and feeding it into the wash container, wherein the fill reservoir is configured as an open, overflow storage unit, such that on condition that fresh water is fed to the fill reservoir via the lower inlet, water flows from the upper outlet by way of the outlet-side fresh water discharge apparatus into the wash container as the quantity of fresh water required for the wash sub-cycle,
at least one heat pump comprising an evaporator thermally coupled to the fill reservoir to extract heat energy from stored fresh water, and a condenser configured to feed heat energy into an interior space of the wash container, and a single-layer or multilayer insulation material system disposed between the interior space of the wash container and an interior space of the fill reservoir to reduce a heat flow from the wash container.

30. A household dishwasher for washing dishes in at least one water-conducting wash sub-cycle and for subsequently drying the dishes in at least one subsequent drying cycle of a wash cycle to be performed, said household dishwasher comprising:
- a wash container for holding the dishes to be washed,
- a fill reservoir attached to an outside of the wash container, said fill reservoir having an inlet connected to an inlet-side fresh water feed apparatus for filling with fresh water from a fresh water network, and an outlet connected to an outlet-side fresh water discharge apparatus for removing a quantity of fresh water required for the wash sub-cycle from the fill reservoir and feeding it into the wash container,
- at least one heat pump comprising an evaporator thermally coupled to the fill reservoir to extract heat energy from stored fresh water, and a condenser configured to feed heat energy into an interior space of the wash container, and
- a single-layer or multilayer insulation material system disposed between the interior space of the wash container and an interior space of the fill reservoir to reduce a heat flow from the wash container,
- wherein the fill reservoir is connected to the wash container in a thermally active manner and the heat pump is operated by a monitoring facility, the monitoring facility being configured to operate the heat pump such that the temperature of fresh water in the fill reservoir during a time period after the end of a heating time segment of a preceding wash sub-cycle, in which a quantity of water in the wash container has been heated via the condenser of the heat pump, until a start of a subsequent wash sub-cycle in which the heat pump is brought into operation again, is lower than a temperature in the wash container, and is lower than an ambient temperature at a site of the household dishwasher predominantly during this time period.

* * * * *